(12) United States Patent
Roehner et al.

(10) Patent No.: US 10,698,022 B2
(45) Date of Patent: *Jun. 30, 2020

(54) TESTING OF SEMICONDUCTOR DEVICES AND DEVICES, AND DESIGNS THEREOF

(71) Applicant: Infineon Technologies AG, Neubiberg (DE)

(72) Inventors: Michael Roehner, Munich (DE); Stefano Aresu, Munich (DE)

(73) Assignee: Infineon Technologies AG, Neubiberg (DE)

( * ) Notice: Subject to any disclaimer, the term of this patent is extended or adjusted under 35 U.S.C. 154(b) by 94 days.

This patent is subject to a terminal disclaimer.

(21) Appl. No.: 15/950,972

(22) Filed: Apr. 11, 2018

(65) Prior Publication Data

US 2018/0292450 A1    Oct. 11, 2018

Related U.S. Application Data

(62) Division of application No. 15/162,679, filed on May 24, 2016, now Pat. No. 9,945,899, which is a division
(Continued)

(51) Int. Cl.
*G06F 17/50* (2006.01)
*G01R 31/26* (2020.01)
(Continued)

(52) U.S. Cl.
CPC ..... *G01R 31/2642* (2013.01); *G01R 19/0092* (2013.01); *G01R 31/129* (2013.01);
(Continued)

(58) Field of Classification Search
CPC .............. G01R 31/2853; G01R 31/129; G01R 19/0092; G01R 31/2601; H01L 22/14;
(Continued)

(56) References Cited

U.S. PATENT DOCUMENTS 5,262,353 A    11/1993   Sun et al.
5,880,024 A     3/1999   Nakajima et al.
(Continued)

FOREIGN PATENT DOCUMENTS

CN       101097958 A     1/2008
JP       2000150654 A    5/2000
TW       200640007 A    11/2006

*Primary Examiner* — Jack Chiang
*Assistant Examiner* — Brandon Bowers
(74) *Attorney, Agent, or Firm* — Slater Matsil, LLP

(57) ABSTRACT

In accordance with an embodiment of the present invention, a method of testing a plurality of semiconductor devices includes applying a stress voltage having a peak voltage on a shield line disposed over a substrate. The substrate has functional circuitry of a semiconductor device. A fixed voltage is applied to a first metal line disposed above the substrate adjacent the shield line. The first metal line is coupled to the functional circuitry and is configured to be coupled to a high voltage node during operation. The peak voltage is greater than a maximum fixed voltage. The shield line separates the first metal line from an adjacent second metal line configured to be coupled to a low voltage node during operation. The method further includes measuring a current through the shield line in response to the stress voltage, determining the current through the shield line of the semiconductor device, and based on the determination, identifying the semiconductor device as passing the test.

23 Claims, 26 Drawing Sheets

Related U.S. Application Data of application No. 14/134,847, filed on Dec. 19, 2013, now Pat. No. 9,377,502.

(51) Int. Cl.

| | |
|---|---|
| *H01L 21/66* | (2006.01) |
| *G01R 31/12* | (2020.01) |
| *G01R 31/28* | (2006.01) |
| *H01L 23/522* | (2006.01) |
| *H01L 23/552* | (2006.01) |
| *H01L 23/00* | (2006.01) |
| *G06F 30/39* | (2020.01) |
| *G06F 30/392* | (2020.01) |
| *G06F 30/394* | (2020.01) |
| *G01R 19/00* | (2006.01) |
| *H01L 23/498* | (2006.01) |
| *H01L 21/027* | (2006.01) |
| *H01L 21/288* | (2006.01) |
| *H01L 21/768* | (2006.01) |
| *H01L 23/528* | (2006.01) |
| *H01L 23/532* | (2006.01) |
| *H01L 23/538* | (2006.01) |
| *G06F 119/18* | (2020.01) |

(52) U.S. Cl.
CPC ..... *G01R 31/2601* (2013.01); *G01R 31/2853* (2013.01); *G06F 30/39* (2020.01); *G06F 30/392* (2020.01); *G06F 30/394* (2020.01); *H01L 21/0273* (2013.01); *H01L 21/2885* (2013.01); *H01L 21/76802* (2013.01); *H01L 21/76873* (2013.01); *H01L 21/76877* (2013.01); *H01L 22/14* (2013.01); *H01L 22/30* (2013.01); *H01L 22/32* (2013.01); *H01L 22/34* (2013.01); *H01L 23/49866* (2013.01); *H01L 23/528* (2013.01); *H01L 23/5225* (2013.01); *H01L 23/5226* (2013.01); *H01L 23/53228* (2013.01); *H01L 23/552* (2013.01); *H01L 24/19* (2013.01); *H01L 24/96* (2013.01); *G06F 2119/18* (2020.01); *H01L 23/5389* (2013.01); *H01L 2224/12105* (2013.01)

(58) Field of Classification Search
CPC ... H01L 22/34; H01L 23/49866; H01L 22/30; H01L 2224/19; H01L 2924/0002; G06F 17/5068; G06F 17/5077
USPC .......................................................... 716/136
See application file for complete search history.

(56) References Cited

U.S. PATENT DOCUMENTS

| | | | | |
|---|---|---|---|---|
| 6,384,463 | B1* | 5/2002 | Miles | H01L 23/552 257/499 |
| 6,951,806 | B1* | 10/2005 | Schweikert | H01L 23/5225 438/183 |
| 7,388,266 | B2 | 6/2008 | Wu | |
| 7,521,741 | B2* | 4/2009 | Jong | H01L 29/0653 257/288 |
| 7,598,585 | B2* | 10/2009 | Wu | H01L 23/5225 257/488 |
| 8,552,472 | B2* | 10/2013 | Kim | H01L 27/10876 257/242 |
| 8,575,952 | B2* | 11/2013 | Kawasaki | G01R 31/31721 324/750.3 |
| 9,377,502 | B2 | 6/2016 | Roehner et al. | |
| 2010/0176838 | A1 | 7/2010 | Kawasaki | |
| 2016/0266197 | A1 | 9/2016 | Roehner et al. | |

* cited by examiner

TESTING OF SEMICONDUCTOR DEVICES AND DEVICES, AND DESIGNS THEREOF

CROSS-REFERENCE TO RELATED APPLICATIONS

This application is a divisional application of U.S. patent application Ser. No. 15/162,679, filed on May 24, 2016, which is a divisional application of U.S. patent application Ser. No. 14/134,847, filed on Dec. 19, 2013, now issued as U.S. Pat. No. 9,377,502, which applications are hereby incorporated herein by reference.

TECHNICAL FIELD

The present invention relates generally to semiconductor devices, and more particularly to testing of semiconductor devices and devices, and designs thereof.

BACKGROUND

Semiconductor devices are used in a variety of electronic applications, such as personal computers, cell phones, digital cameras, and other electronic equipment, as examples. Semiconductor devices are typically fabricated by sequentially depositing insulating or dielectric layers, conductive layers, and semiconductive layers of material over a semiconductor substrate, and patterning the various layers using lithography to form circuit components and elements thereon.

One of the challenges associated with semiconductor manufacturing relates to product yield and/or reliability. Consumers of semiconductor devices expect a certain level of reliability from their devices. This is even more critical when the semiconductor device is used in safety critical applications. However, a product may fail during its lifetime due to defects introduced during manufacturing.

Reliability issues may also result in failure of the process from being qualified, poor yield at the semiconductor device fabrication facility, and/or failure at the field, either of which may result in product recalls and/or loss in revenue. These problems become even more exacerbated in case of high voltage applications.

SUMMARY

In accordance with an embodiment of the present invention, a semiconductor device comprises a first metal line disposed over a substrate comprising circuitry, and a second metal line disposed adjacent the first metal line. The first metal line and the second metal line are metal lines configured to supply different voltages to the circuitry. A third metal line is disposed between the first metal line and the second metal line. The third metal line is not part of any functional circuit in the substrate and not coupled to any potential node.

In accordance with an embodiment of the present invention, a method of testing a plurality of semiconductor devices comprises applying a stress voltage having a peak voltage on a shield line disposed over a substrate, the substrate comprising functional circuitry of a semiconductor device. A fixed voltage is applied to a first metal line disposed above the substrate adjacent the shield line. The first metal line is coupled to the functional circuitry and is configured to be coupled to a high voltage node during operation. The peak voltage is greater than a maximum fixed voltage. The shield line separates the first metal line from an adjacent second metal line configured to be coupled to a low voltage node during operation. The method further includes measuring a current through the shield line in response to the stress voltage, determining the current through the shield line of the semiconductor device, and based on the determination, identifying the semiconductor device as passing the test.

In accordance with an embodiment of the present invention, a method of designing a semiconductor device comprises identifying a region in a layout of the semiconductor device, the region comprising a first metal line configured to be coupled to a high voltage node and a second metal line configured to be coupled to a low voltage node. The method further includes modifying the layout of the semiconductor to include a third metal line between the first metal line and the second metal line. The third metal line has an external contact pad but not being part of and coupled to any functional circuit of the semiconductor device.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIGS. 1A and 1B illustrate defect density associated failure of different metal line structures, wherein FIG. 1A illustrates a typical break down characteristic for a dielectric isolation and wherein FIG. 1B illustrates the effect of increasing the dielectric thickness vertically or laterally;

FIGS. 2A and 2B illustrate metal lines separated by a shield line in accordance with an embodiment of the present invention, wherein FIG. 2A illustrates a vertical configuration and FIG. 2B illustrates a horizontal configuration;

FIGS. 5A and 5B illustrate a shield region formed around a power line in accordance with an embodiment of the present invention, wherein FIG. 5A illustrates a cross-sectional view and FIG. 5B illustrates a top view;

FIGS. 6A and 6B illustrate testing a semiconductor device in accordance with an embodiment of the present invention, wherein FIG. 6A illustrates a shield line coupled to a voltage node that is configured to apply a voltage pulse and FIG. 6B illustrates an alternative embodiment of measuring the integrity of the isolation region surrounding a high voltage power line;

FIGS. 8A-8C illustrate top views of a high voltage line running adjacent a low voltage line in accordance with embodiments of the present invention, wherein FIG. 8A illustrates a high voltage first metal line adjacent to a lower voltage second metal line, FIG. 8B illustrates a shield line introduced between the first metal line and the second metal line, and FIG. 8C illustrates a different configuration of the shield line in accordance with an alternative embodiment of the present invention;

FIGS. 10A-10F illustrate the semiconductor device during various stages of processing in accordance with an embodiment of the present invention, wherein FIG. 10A illustrates a patterned first insulating layer, FIG. 10B illustrates this layer after via formation, FIG. 10C illustrates the formation of the metal one pattern and FIG. 10D illustrates the structure after filling of metal and subsequent planarization such as CMP, forming metal lines in the first metal level, FIG. 10E illustrates metal level $M_2$, $M_3$ and via levels $V_2$, $V_3$, FIG. 10F illustrates the semiconductor device after forming additional shield lines and the metal line configured to carry a high voltage;

FIGS. 11A-11F illustrate the semiconductor device during various stages of processing in accordance with an embodiment of the present invention, wherein FIGS. 11A, 11C-11F illustrate cross-sectional view and FIG. 11B illustrates a top view, FIG. 11A illustrates a patterned hard mask layer deposited over the semiconductor device, FIG. 11B illustrates a top view of the patterned hard mask layer, FIG. 11C illustrates the device after an anisotropic etching process is performed to etch underlying insulating layers, FIG. 11D illustrates a fill metal deposited within the openings, FIG. 11E illustrates the device after fill metal is etched to remove any fill metal from the top surface of the passivation layer, and FIG. 10 illustrates another embodiment showing a partially fill of the openings;

FIG. 12A illustrates a reconstituted wafer comprising a plurality of semiconductor chips having a plurality of contact pad, FIG. 12B illustrates after a passivation layer is formed around the front side metallization layer and patterned, FIG. 12C illustrates a magnified view of the semiconductor package during fabrication after formation of front side redistribution layer in accordance with an embodiment of the invention, FIG. 12D illustrates the device after forming a first redistribution metal line, a second redistribution metal line, a shield redistribution line, and contact pads, FIG. 12E illustrates the device after stripping the patterned photo resist layer to expose the conductive liner, and FIG. 12F illustrates the device after etching the exposed conductive liner; and FIGS. 13A-13C illustrate a further embodiment of a process including wafer level processing to form a shield line between adjacent redistribution lines, wherein FIG. 13A illustrates the device after the formation of openings, FIG. 13B illustrates the device after the formation of the patterned photo resist layer and the shield redistribution line, the first redistribution metal line, and the second redistribution metal line, and FIG. 13C illustrates the device after removing, i.e., etching the patterned photo resist layer.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to various embodiments in specific contexts, namely implemented in power device applications. Embodiments of the invention may also be implemented in other semiconductor applications such as memory devices, logic devices, analog devices, radio frequency (RF) devices, digital devices, and other applications that utilize metal lines, for example.

The inter-metal distance is a critical factor especially when metal lines carry high voltages. For example, when a metal line carrying high voltage is next to another metal line at a lower voltage, a large potential difference develops across the dielectric layer separating the high voltage metal line and the low voltage metal line. The potential difference can result in a subsequent fail, which may be present before product operation, or may develop during product lifetime. However, present testing methodology cannot identify these defects. For example, conventional methods such as detecting a leakage current by applying a voltage between the high voltage metal line and low voltage metal line may not find any difference between a part that fails subsequently and a part that will not fail. In various embodiments, the present invention teaches a method, a design, and a device to overcome these problems.

A structural embodiment of the present invention will be described using FIG. 2. Further structural embodiments will be described using FIGS. 4, 5, 8, 9, 11F, 12F, and 13C. A method of testing the device will be described using FIG. 6. A method of designing and/or fabricating the semiconductor will be described using FIGS. 3, 10, 11, 12, and 13.

Figure 1A:
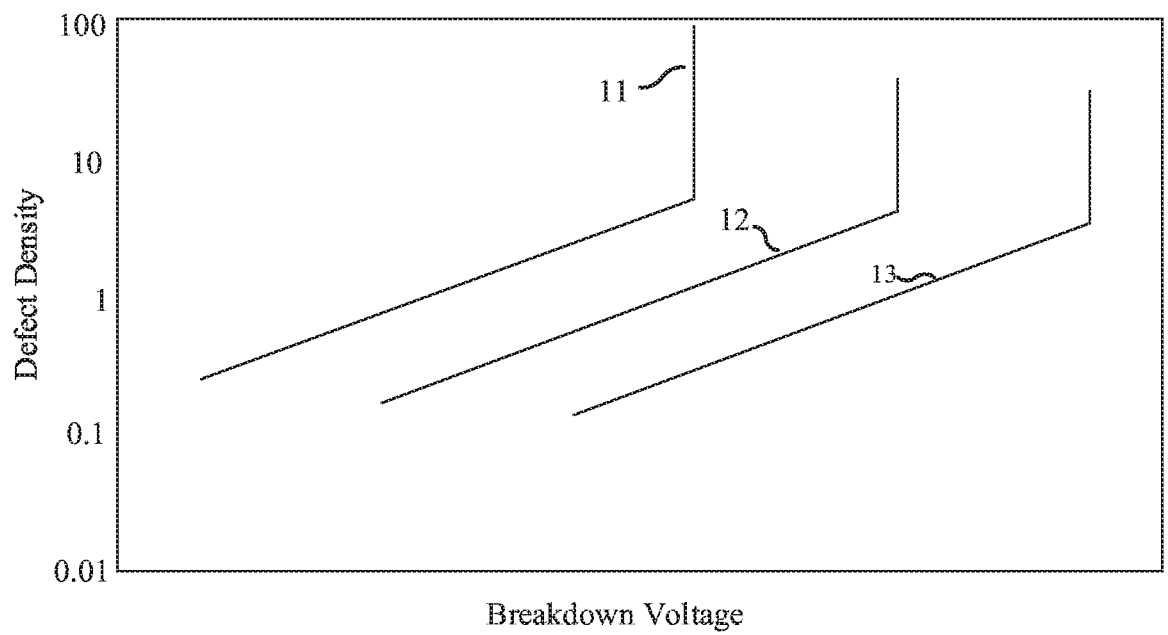
Figure 1B:
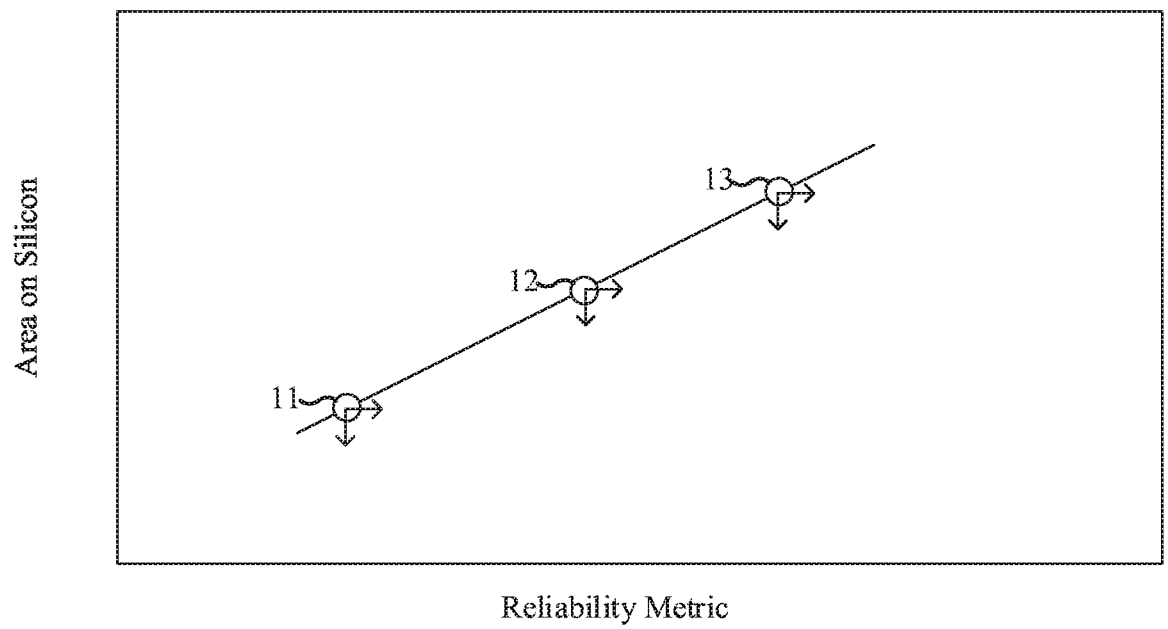

FIG. 1, which includes FIGS. 1A and 1B, illustrates defect density associated failure of different metal line structures.

Failure rate targets for various semiconductor process technologies such as those used to produce automotive components are increasingly becoming more stringent. For example, failure rates below 1 ppm are expected for many applications. On the other hand, higher voltages are used in many technologies, which increase the propensity for failure especially. Back end of the line (BEOL) metal lines, which may include capacitors, and also front end of the line (FEOL) capacitors have difficulty meeting these stringent reliability requirements solely by technological improvements because reliability may be determined by extrinsic defect density levels, which may not be controlled by the semiconductor device manufacturer. For example, a dust particle may become deposited onto the metal lines shorting them. Alternatively, for example, process variations may result in forming pockets of dielectric with poor isolation, narrowing/widening of metal lines, depositing particles that introduce a lower quality dielectric path between adjacent metal lines. For FEOL-devices and FEOL-capacitors a poor quality of the electrodes or the dielectric might be the reason for extrinsic defects.

Referring to FIG. 1A, a typical break down characteristic for a dielectric isolation is shown. The first curve 11 is representative of a first dielectric thickness/spacing of metal lines while the second curve 12 is representative of a second dielectric thickness/spacing of metal lines. In the illustration, the first dielectric thickness/spacing of the first curve 11 is smaller than the second dielectric thickness/spacing of the second curve 12. In other words, using a thicker dielectric isolation shifts curve 11 to curve 12. This is however at the cost of lower specific capacitance both for FEOL and BEOL capacitors. The shallower branches of the curves (lower slope) are related to extrinsic breakdowns, while the steeper part of the curves is due to intrinsic failures. The extrinsic breakdown may be a result of process defects such as introduction of particles, variations in metal line widths, quality of dielectric, and others. The intrinsic breakdown is a physical limitation of the dielectric defined as the minimum voltage that causes a portion of an insulator to become electrically conductive. Accordingly, the breakdown in isolation, which occurs at much lower voltages, is due to extrinsic breakdown rather than the. Accordingly, the breakdown in isolation, which occurs at much lower voltages, is due to extrinsic breakdown rather than the intrinsic breakdown of the dielectric. Consequently, for a given defect density, the first curve 11 fails at a lower voltage than the second curve 12 illustrating that the smaller gap distance has a higher probability of failure. There is no solution so far available for technologies with stringent (particles per million) ppm target, for example, less than a few ppm. To meet functional safety requirements, for example, where a short between different voltage domains is critical, area consuming measures are used.

In other words, as illustrated in FIG. 1B, increasing the dielectric thickness vertically or laterally (as described above curve 13 has the largest gap while curve 11 has the smallest) improves the reliability (improvement going from left to right on the x-axis of FIG. 1B). However, there is an area penalty associated with this improvement, which increases the fabrication costs. For FEOL devices this is mostly not possible, because electrical parameters would also change with increased dielectric thickness. Thus, there is a trade-off between improvements in reliability versus the area consumed. In particular, a given process may be constrained to move along the line illustrated in FIG. 1B. It would be advantageous to break this trade-off (shown by the small arrows). Embodiments of the present invention break this trade-off by identifying susceptible chips in a cost effect way, without consuming as much area as the above trade-off.

Another way of improving reliability is to increase the distance between the metal lines with large voltage differences and using a burn-in to screen out devices with the extrinsic defects. However, burn-in is a process in which a voltage slightly higher than operating voltage is used at a higher temperature for a long time. The applied voltage, although higher than operating voltage, is restricted to avoid complete breakdown of other the devices being tested simultaneously. However, these measures cost both too much area or test time. Additionally not all lines are accessible by a burn-in process.

Figure 2A:
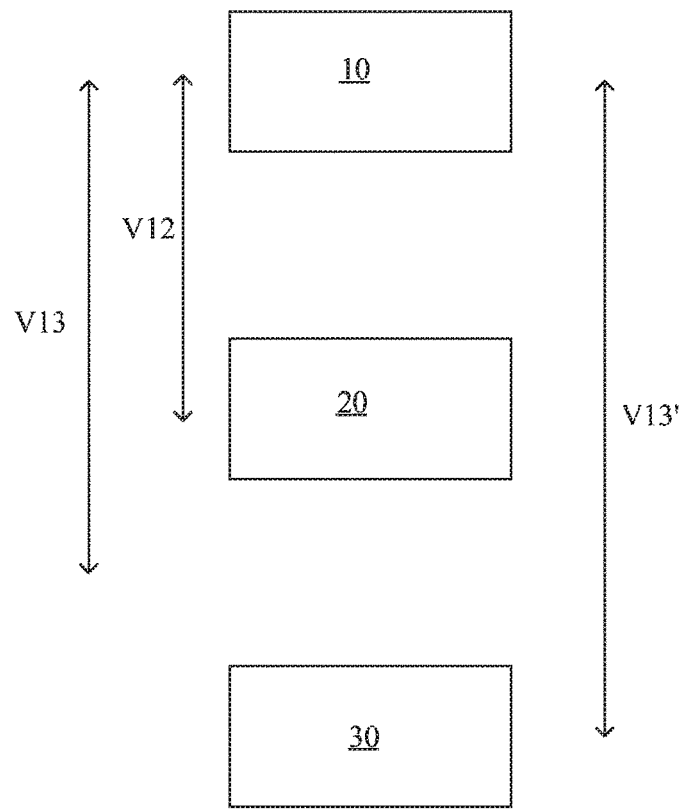
Figure 2B:
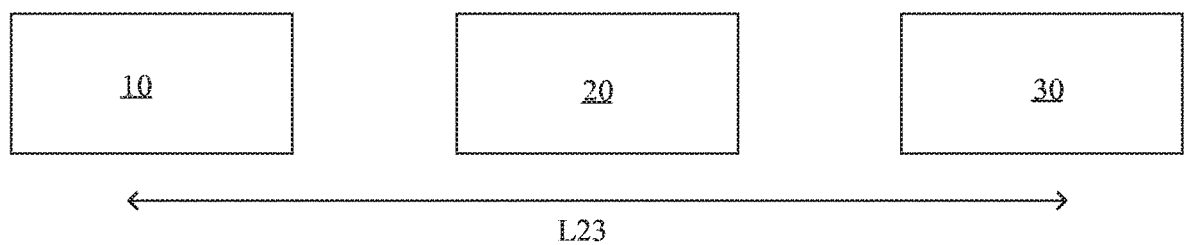

FIG. 2, which includes FIGS. 2A and 2B, illustrates metal lines separated by a shield line in accordance with an embodiment of the present invention, wherein FIG. 2A illustrates a vertical configuration and FIG. 2B illustrates a horizontal configuration.

In various embodiments of the present invention, a fast and efficient method to detect weak regions of the metal lines is presented. Additional shield lines are formed around metal lines in regions that are more susceptible to shorting. The shield lines do not couple to any other circuitry in the substrate. Therefore, the shield lines do not draw any other type of leakage currents. For example, if the shield line were to be connected to a functional circuit, even in OFF mode, the leakage current due to diodes, transistors may result in a noise floor of micro-amps. In contrast, the shield lines may be able to detect leakage currents as low as a few nano-amps. Consequently, very small amount of current through the shield lines can be detected. Such leakage currents are indicative of regions that are susceptible to failure. This dramatic improvement of detection by over $1000\times$-$10^6\times$ is a direct result of not coupling the shield lines to any other circuit.

Referring to FIG. 2A, a shield line 20 is disposed between a first metal line 10 and a second metal line 30. The first metal line 10 and the second metal line 30 have a portion in which they run parallel to each other and have a large voltage difference between them during operation. For example, the first metal line 10 may be configured to carry a high voltage while the second metal line 30 may be configured to carry a low voltage.

As illustrated in FIG. 2A, a shield line 20 is disposed between the first metal line 10 and the second metal line 30. FIG. 2A also illustrates the inter-metal distance V13 between two metal lines in the absence of shield lines. Relative to a design with now shield line, the inter metal distance V13' between the first metal line 10 and the second metal line 30 may be increased due to the introduction of the shield line 20. However, the increase in the inter-metal distance V13' may not be large compared to a design with no shield line.

The shield line 20 is not connected to any other circuit within the substrate. Accordingly, there are no parasitic circuits or leakage circuits associated with the shield line 20. For example, a metal line connected to the substrate may have an associated leakage current even if all the devices are not active. Advantageously, the shield line 20 does not conduct such a leakage current because it is not coupled to any circuitry on the chip. Rather, the shield line 20 is coupled only to external pads for applying a voltage to the shield line 20.

FIG. 2B illustrates an alternative embodiment in which the first metal line 10 is separated from the second metal line 30 by a shield line 20. In this case, the lateral distance L13 between first metal line 10 and the second metal line 30 is controlled so that the shield line 20 may be inserted between these lines. However, again the introduction of the shield line 20 may not increase the inter-metal distance significantly.

Figure 3:
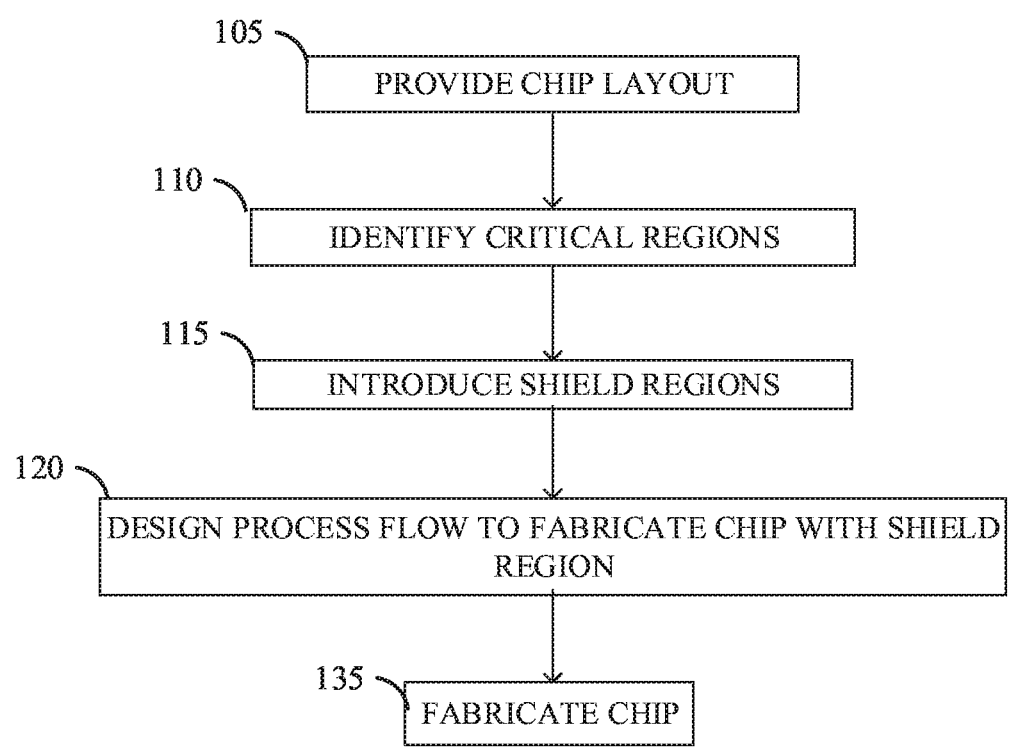
FIG. 3 illustrates a flow chart of implementing the diagnostic method described in various embodiments of the present invention.

FIG. 3 illustrates a flow chart of implementing the diagnostic method described in various embodiments of the present invention.

Referring to FIG. 3, the chip layout is provided in a first step 105. The chip layout may include the layout of the metallization layers and may also include information regarding the lines carrying high voltages. Next, the layout is analyzed to identify critical regions in which metal lines carrying high voltages are adjacent metal lines carrying low voltages during operation (second step 110). For example, a predefined inter-metal distance may be used to identify such metal lines in regions of the layout where the voltage difference exceeds a predefined limit one embodiment. In another embodiment, the predefined inter-metal distance may be normalized by the potential difference. For example, in circuits having voltage lines carrying different voltages, the distance may be normalized (e.g., by dividing the voltage difference by the inter-metal distance) to determine regions of the layout in which the electric field across the dielectric material exceed a certain critical number. Further, in various embodiments, more complicated schemes or rules may be generated, e.g., to determine the regions of the chip in which the metal lines are not immediately below or laterally in the same metal level.

Next, as illustrated in FIG. 3, in the third step 115, the shield regions are introduced. The shield lines perform no function during operation of the chip. Rather, the shield lines are test structures to identify defects introduced during processing.

Referring to the fourth step 120, a process flow is generated to fabricate a semiconductor chip with the shield regions and the semiconductor chip is thus fabricated (fifth step 135).

Figure 4:
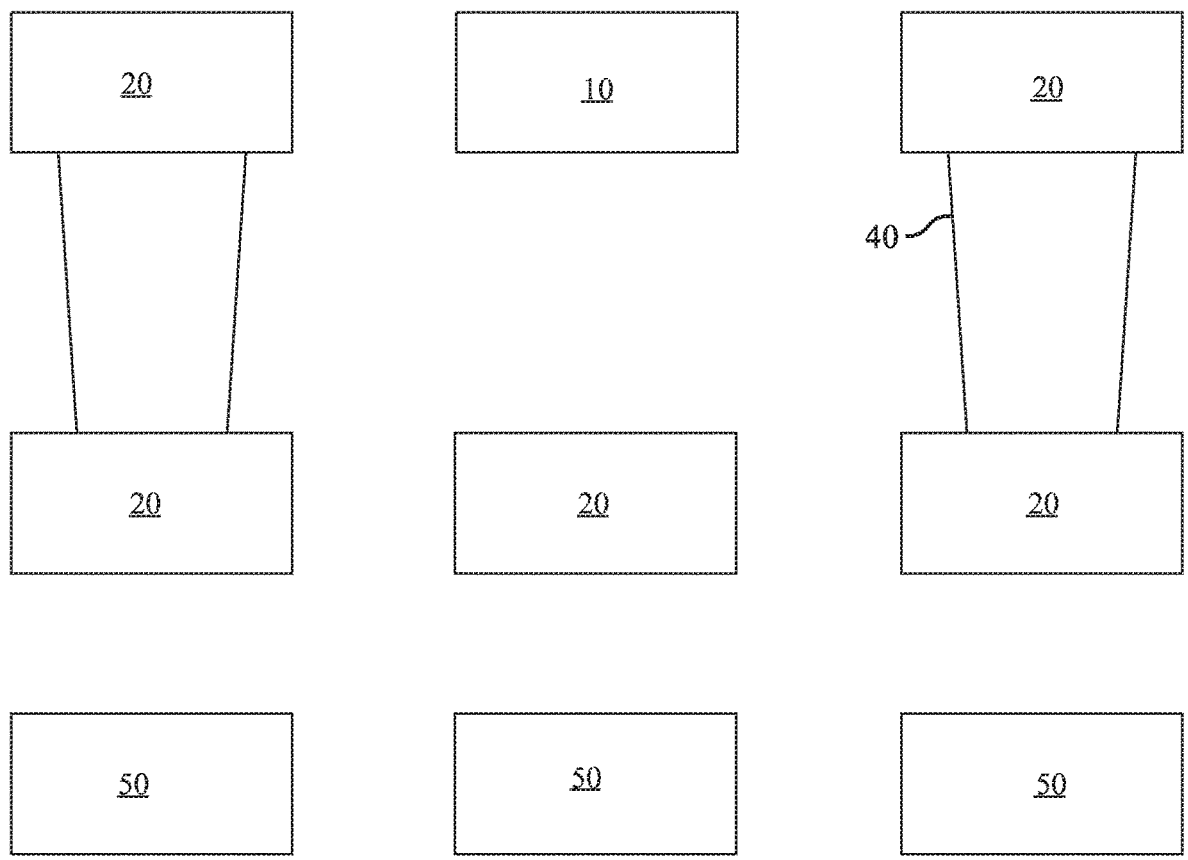
FIG. 4 illustrates a shield region formed around a power line in accordance with an embodiment of the present invention.

FIG. 4 illustrates a shield region formed around a power line in accordance with an embodiment of the present invention.

Referring to FIG. 4, the shield line 20 may be formed in more than one metallization layers in various embodiments. For example, the shield line 20 may be formed between the power line (e.g., the first metal line 10) and all other metal lines 50. As illustrated in FIG. 4, the shield line 20 surrounds the first metal line 10 both laterally and vertically. The metal lines disposed below the shield line 20 may be coupled to other metal lines that are laterally disposed around the first metal line 10 through vias 40. Thus, in this embodiment, a more complete protection of the first metal line 10 is possible.

Figure 5A:
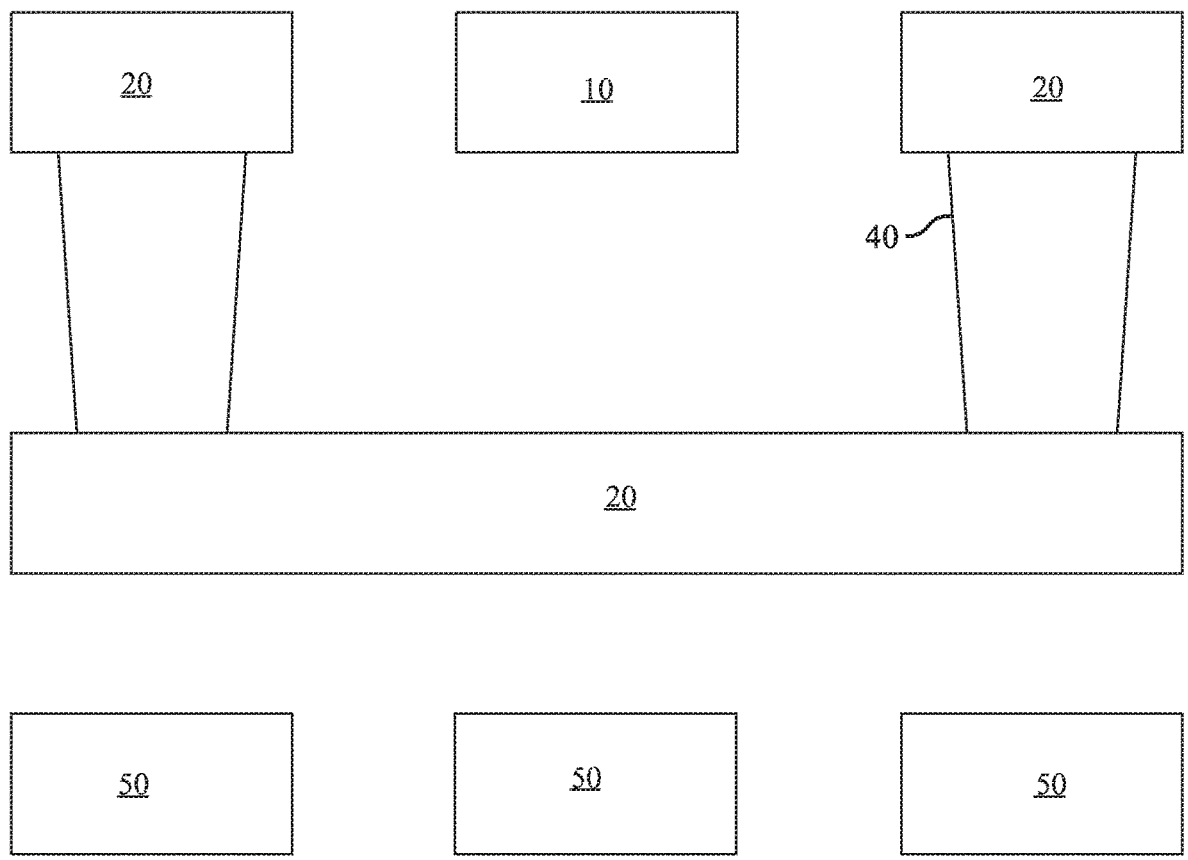
Figure 5B:
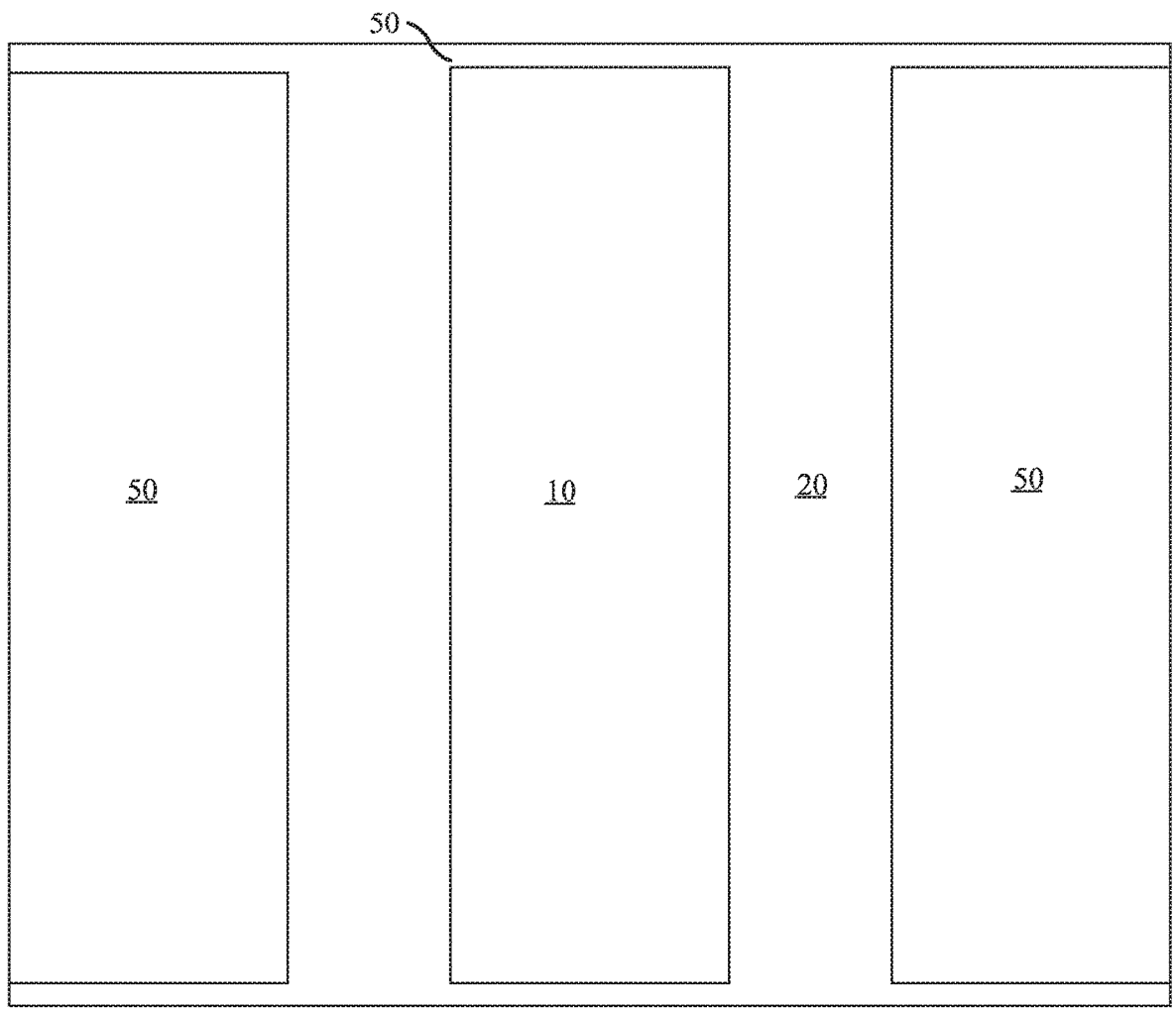

FIG. 5, which includes FIGS. 5A and 5B, illustrates a shield region formed around a power line in accordance with an embodiment of the present invention. FIG. 5A illustrates a cross-sectional view and FIG. 5B illustrates a top view.

In a further embodiment, the shield line 20 may be formed as a pad underneath the first metal line 10 (FIG. 5B) so as to separate the first metal line 10 from all other metal lines 50.

Figure 6A:
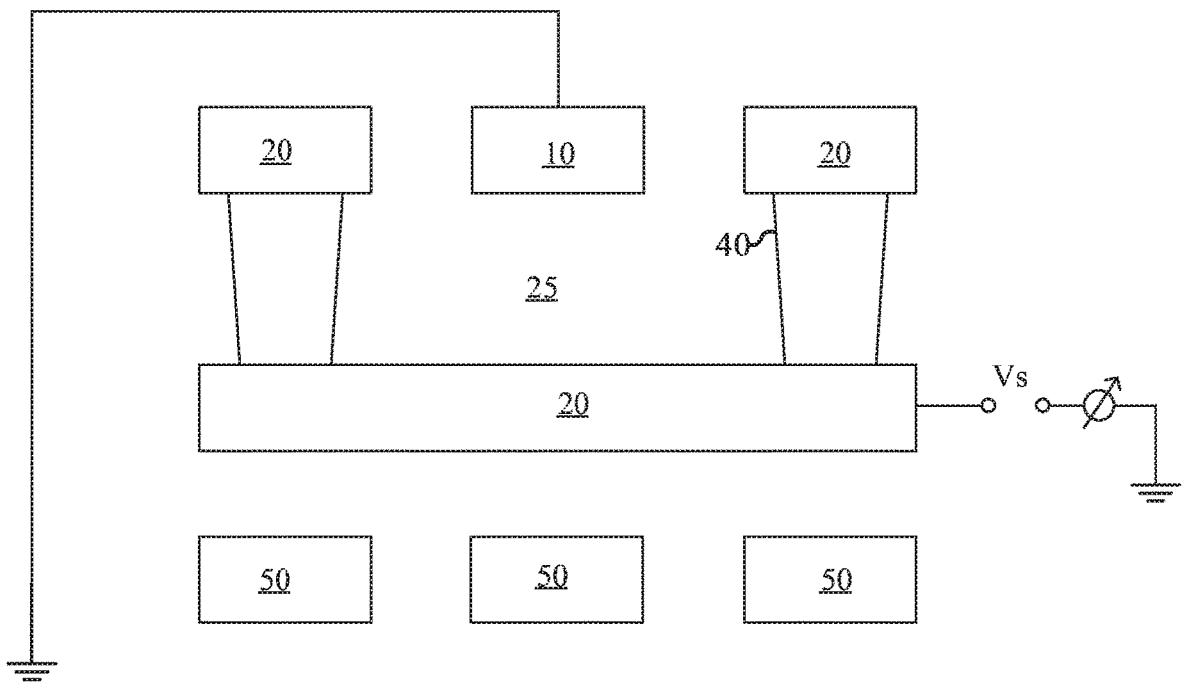
Figure 6B:
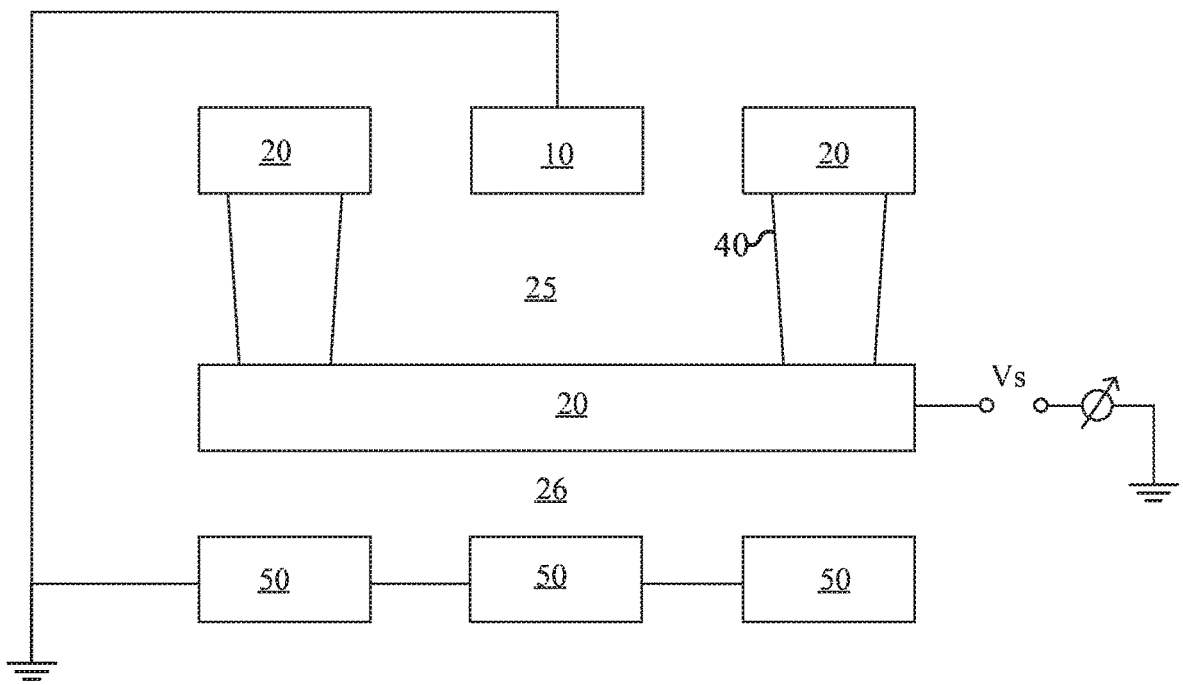

FIG. 6, which includes FIGS. 6A and 6B, illustrates a semiconductor device in accordance with an embodiment of the present invention.

Referring to FIG. 6A, the device may be tested during or after fabrication in various embodiments. The testing may be performed after fabrication and dicing in one embodiment. In another embodiment, the testing may be performed prior to dicing. In yet another embodiment, the testing may be performed during fabrication, for example, after the completion of a specific metal level, for example, that has the metal line to be tested.

As illustrated in FIG. 6A, the shield line 20 may be coupled to a voltage node that is configured to apply a voltage pulse Vs. The current flowing through the shield line 20 may be measured using a current meter. In various embodiments, a high voltage may be applied through the shield line 20. In one embodiment, the high voltage may be applied as short pulse. For example, in various embodiments, the high voltage may be applied for less than a few 100 ns, and less than 10 ns in one embodiment. In various embodiments, the high voltage may be applied for a time between about 1 ns to about 100 ns. In various embodiments, the high voltage may be about 10 V to about 100 V. In various embodiments, a ratio of the peak voltage applied on the shield line 20 during stress to the maximum peak voltage applied to the functional circuit during operation is about 1.2:1 to about 10:1. In various embodiments, a ratio of the maximum voltage applied during operation of the chip on the first metal line 10 to the maximum voltage applied during operation of the chip on the other metal lines 50 is about 5:1 to 100:1.

Because the shield line 20 is not coupled to any other circuit in the device, the current flowing through the shield line 20 is indicative of leakage current associated with the extrinsic breakdown of the isolation 25 between the first metal line 10 and the shield line 20. For example, in the absence of any leakage or defects, the current through the shield line 20 as measured by the current meter may be less than 1 nA. Therefore, even a small increase in leakage current may be measurable. For example, weak devices that would otherwise pass all functional tests may be identified. In contrast, if the shield line 20 is coupled to any circuit, a certain amount of leakage current is unavoidable, which inhibits the ability of the current meter to sense the leakage current associated with the breakdown of the isolation 25 between the first metal line 10 and the shield line 20

Further, since the first metal line 10 and the substrate may be grounded. Accordingly, the first metal line 10 and any other circuit in the substrate is not subjected to the high voltage applied through the shield line 20. Therefore, there is no danger of damaging any of the components of the circuit due to the high voltage.

FIG. 6B illustrates an alternative embodiment of measuring the integrity of the isolation region surrounding a high voltage power line.

In this embodiment, both the high voltage line and low voltage line are coupled to a lower potential, such as a ground potential. For example, as illustrated in FIG. 6B, the first metal line 10 and all metal lines 50 are coupled to ground. Consequently, if a high voltage pulse is applied on the shield line 20, the isolation 25 between the first metal line 10 and the shield line 20 as well as the isolation 26 between the shield line 20 and all metal lines 50 is tested. Any leakage current measured during the testing is indicative of problems in the isolation.

In various embodiments, the testing process may include the operations described in both FIGS. 6A and 6B. Thus, the location of the failure may also be identified so that process changes may be adopted to improve subsequent process yield.

Advantageously using embodiments of the present invention, the shield lines of all the critical regions may be shorted together so that large areas of the semiconductor chip (or even all of the chip) may be tested simultaneously in parallel.

In an alternative embodiment, the above testing may be performed as a diagnostic test at the start of the device, for example, after powering on or after a time interval. An external or internal diagnostic program, for example, a built in self-test, may initiate this test. The leakage at the shield lines can then be used to monitor the integrity of the isolation regions of the chip. An increase in leakage current at the shield lines may initial the chip to take protective action, for example, transition the chip to go into a safe state before a malfunction occurs.

Figure 7:
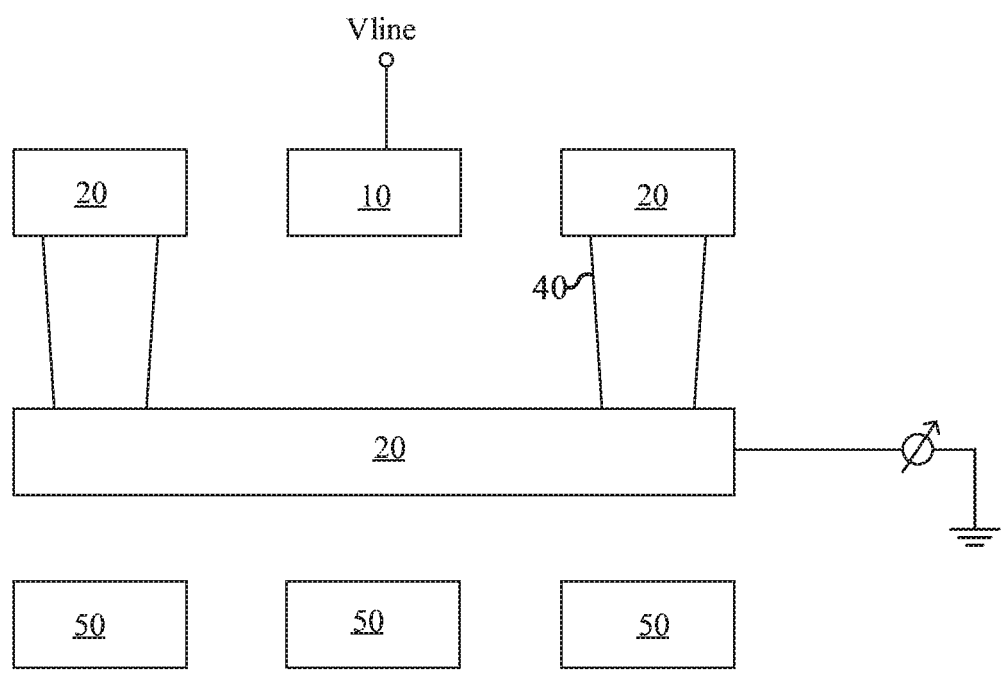
FIG. 7 illustrates an alternative embodiment of testing the isolation region around the high voltage power line.

FIG. 7 illustrates an alternative embodiment of testing the isolation region around the high voltage power line.

In this embodiment, the high voltage pulse is applied on the first metal line 10 while the shield line 20 is grounded. The current flowing through the shield line 20 is measured.

Figure 8A:
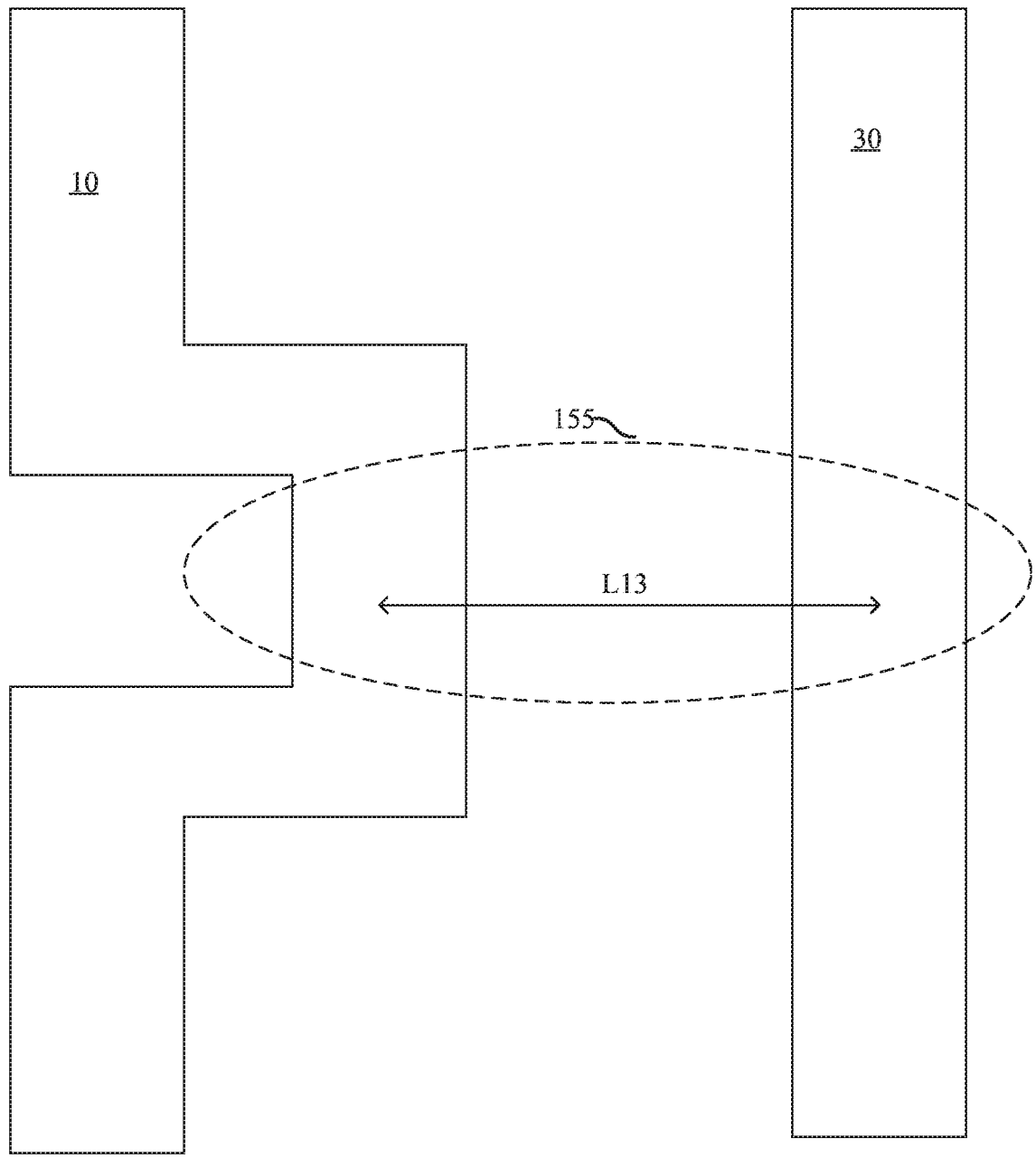
Figure 8B:
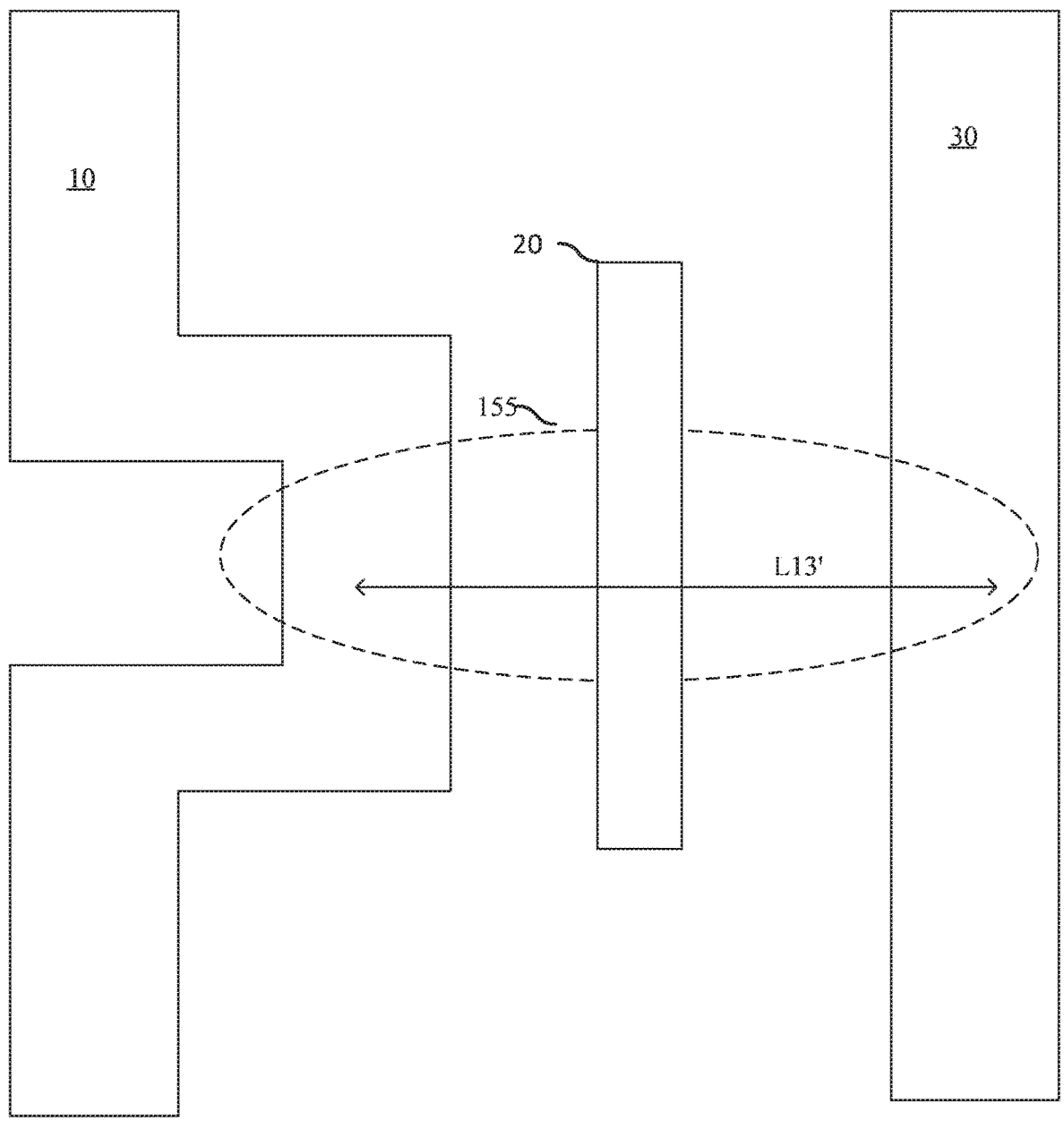
Figure 8C:
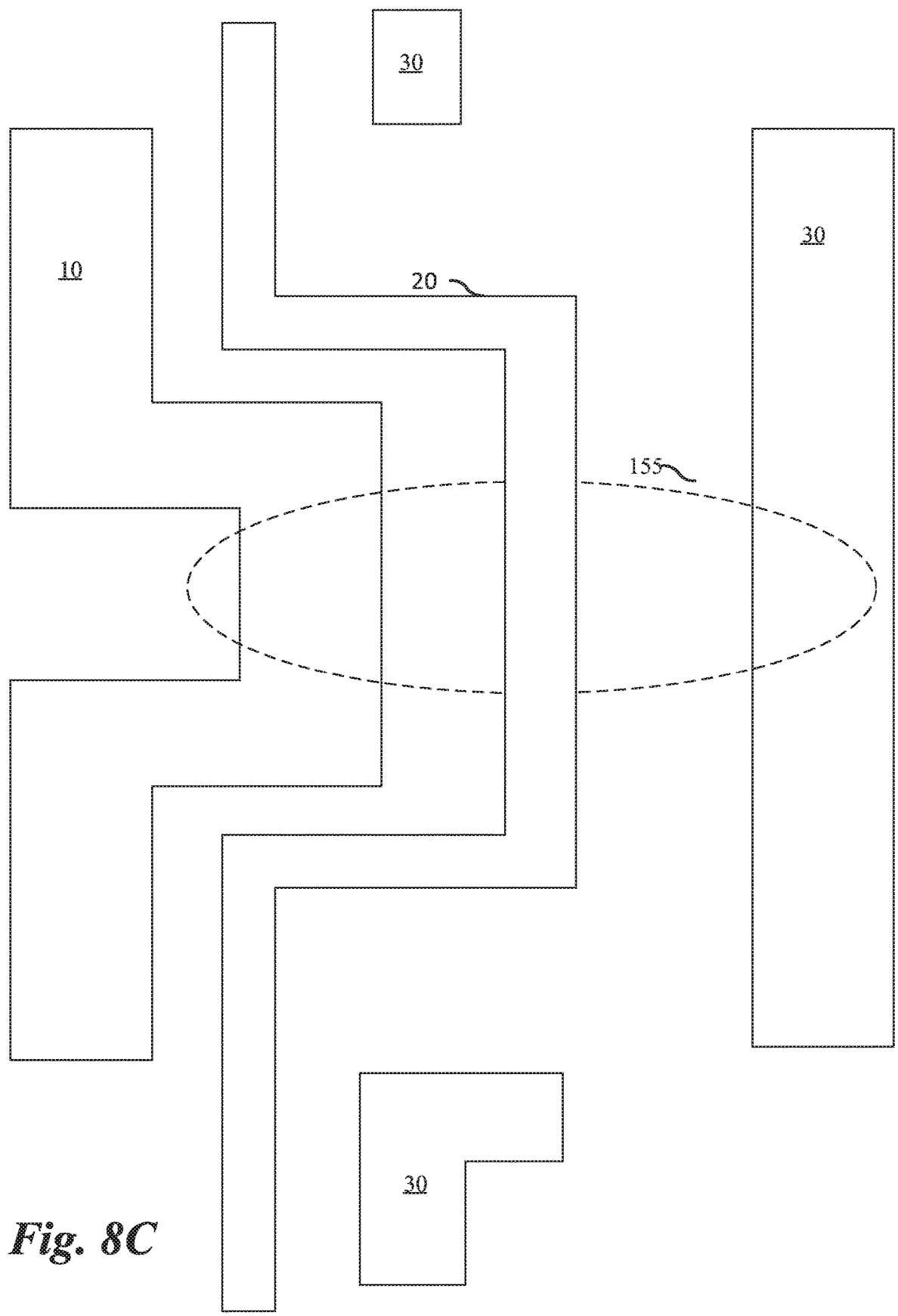

FIG. 8, which includes FIGS. 8A-8C, illustrates top views of a high voltage line running adjacent a low voltage line in accordance with embodiments of the present invention.

FIG. 8A illustrates a conventional layout in which the high voltage line, for example, a first metal line 10 carrying high voltage is adjacent another metal line, for example, a second metal line 30 carrying a lower voltage. In accordance with embodiments of the present invention, a critical region 155 is identified which is susceptible to extrinsic breakdown of the isolation between the first metal line and the second metal line. As illustrated, the lateral distance L13 between the first metal line 10 and the second metal line 30 is less than a predefined critical distance (for example, as described previously).

Rather, than translating the metal lines to increase the distance L13 between the first metal line 10 and the second metal line 30, as illustrated in FIG. 8B, a shield line 20 is introduced between the first metal line 10 and the second metal line 30. The shield line 20 is used to test the integrity of the isolation between the first metal line 10 and the second metal line 30. However, the distance L13' between the first metal line 10 and the second metal line 30 in FIG. 8B is not significantly more than the distance L13 between the first metal line 10 and the second metal line 30 in FIG. 8A. For example, in one or more embodiments, the ratio of the distance L13 between the first metal line 10 and the second metal line 30 in FIG. 8A to the distance L13' between the first metal line 10 and the second metal line 30 in FIG. 8B may be about 1:1.1 to about 1:1.8, and less than 1:2 in various embodiments.

FIG. 8C illustrates a different configuration of the shield line in accordance with an alternative embodiment of the present invention.

As illustrated in FIG. 8C, the shape of the shield line 20 may be modified to test the integrity of the isolation region in more than one direction. In FIG. 8C, the shield line 20 is formed in a concave shape surrounding the high voltage metal line, i.e., the first metal line 10.

Figure 9:
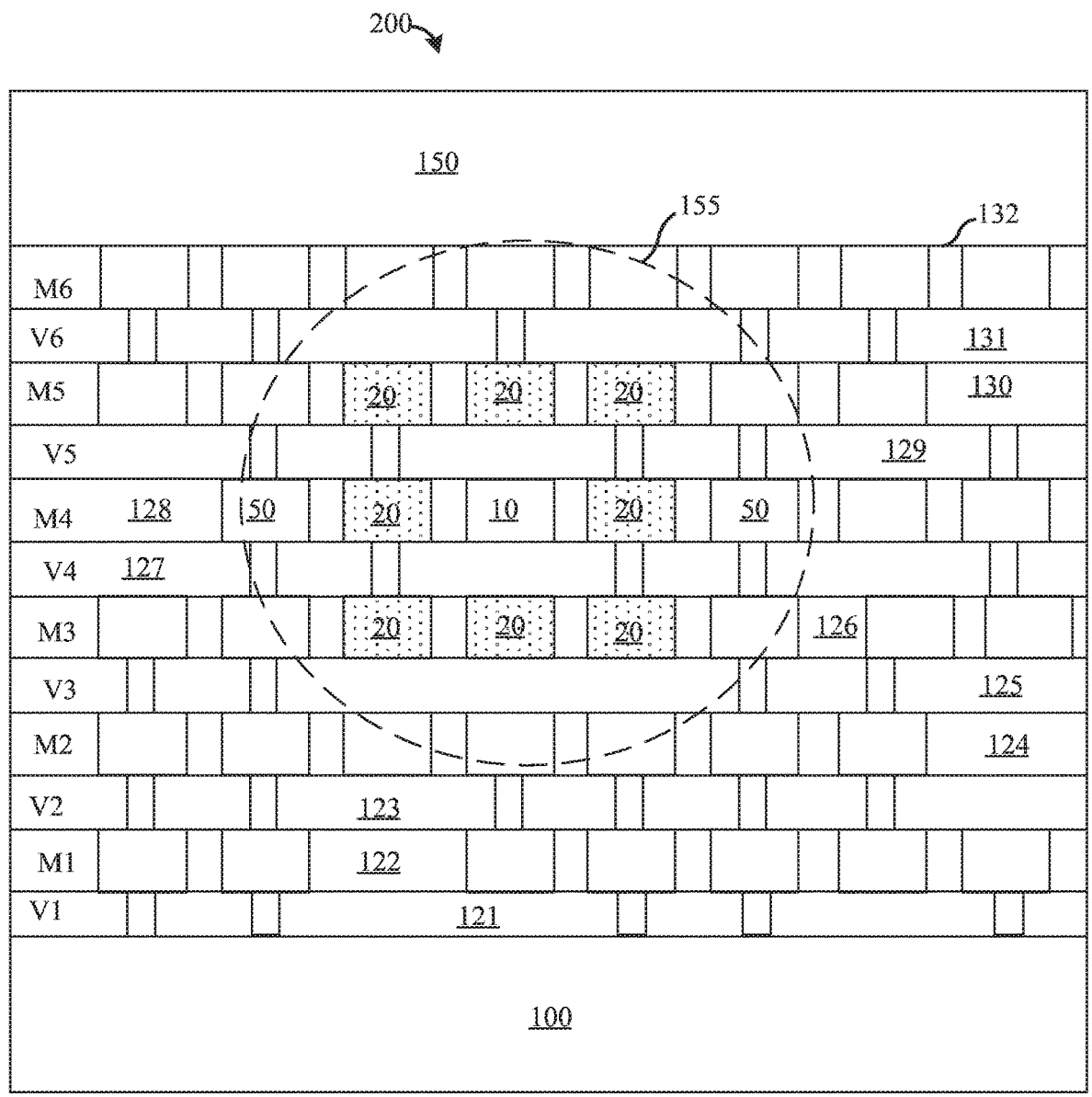
FIG. 9 illustrates an alternative structure of the shield line in accordance with embodiments of the present invention.

FIG. 9 illustrates an alternative structure of the shield line in accordance with embodiments of the present invention.

In this embodiment, the shield lines 20 surround the first metal lines 10 such that they are formed vertically above and below and laterally in both directions. FIG. 9 illustrates a cross sectional view of the semiconductor device 200 (not shown to scale), which may include active circuitry disposed inside it. The active circuitry may include active device regions and includes necessary transistors, resistors, capacitors, inductors or other components used to form integrated circuits. For example, active areas that include transistors (e.g., CMOS transistors) may be separated from one another by isolation regions, e.g., shallow trench isolation. Next, metallization is formed over the active device regions to electrically contact and interconnect the active devices. The metallization and active device regions together form a completed functional integrated circuit. In other words, the electrical functions of the semiconductor device 200 can be performed by the interconnected active circuitry. In logic devices, the metallization may include many layers, e.g., nine or more, of copper or alternatively of other metals. In memory devices, such as DRAMs, the number of metal levels may be less and may be aluminum. For example, in FIG. 9, six metal levels comprising $M_1$, $M_2$, $M_3$, $M_4$, $M_5$, and $M_6$ are stacked vertically and connected by contact and via levels $V_1$, $V_2$, $V_3$, $V_4$, $V_5$, and $V_6$. In other embodiments, more or less number of metal and via levels may be used.

The first via level $V_1$ comprising a plurality of vias of different designs are disposed above the substrate 100 in a first insulating layer 121, the first insulating layer 121 being disposed over the substrate 100. The substrate 100 may include a semiconductor substrate and/or a dielectric layer over a semiconductor substrate in various embodiments. Similarly, a second insulating layer 122 includes a plurality of metal lines of different designs at a first metal level $M_1$. Similarly, subsequent layers of the insulating layer include a corresponding metal lines or vias. For example, the third insulating layer 123 includes a second via level V2, the fourth insulating layer 124 includes a second metal level M2, the fifth insulating layer 125 includes a third via level $V_3$, the sixth insulating layer 126 includes a third metal level $M_3$, the seventh insulating layer 127 includes a fourth via level $V_4$, the eighth insulating layer 128 includes a fourth metal level $M_4$, the ninth insulating layer 129 includes a fifth via level $V_5$, the tenth insulating layer 130 includes a fifth metal level $M_5$, the eleventh insulating layer 131 includes a sixth via level V6, and a twelfth insulating layer 132 includes a sixth metal level M6.

The pitch (distance between adjacent vias or between adjacent metal lines) at each metal level is controlled by the minimum allowed spacing defined for the particular technology.

In this embodiment, the shield lines 20 are formed during the formation of the metal lines for back end of the line processing. The shield lines 20 are formed around the first metal line 10 that is carrying a high voltage line in a region where other metal lines 50 are adjacent. For example, the region 155 of the semiconductor device is a region in which the high voltage metal line runs parallel to other lower voltage lines.

Therefore, this region may be identified as susceptible to extrinsic breakdown of the isolation. As illustrated in FIG. 8A, the first metal line 10 may be surrounded by the shield lines 20. Further, as described in prior embodiments, the shield lines 20 may not be coupled (electrically, inductively, capacitively, and resistively) to any other circuit of the semiconductor device. In other words, the shield lines 20 are electrically isolated from the first metal line 10 and any other circuit in the semiconductor device. In particular, devices in which the shield lines 20 are not completely isolated (due to the breakdown of the isolation) fail the testing or screening process and are not part of the final working product. In a working product, the shield lines 20 are isolated from the first metal line 10 and all other metal lines 50.

FIG. 10, which includes FIGS. 10A-10F, illustrates the semiconductor device during various stages of processing in accordance with an embodiment of the present invention.

First front end of the line processing is performed. Front end of the line processing includes forming the active regions, diffusion regions and other regions within the semiconductor substrate 100. Subsequently, back end of the line processing is performed. Back end of the line processing includes the metallization processes to interconnect the various components or devices in the semiconductor substrate 100.

In various embodiments, the metal lines may be formed using a subtractive process or an additive process such as a damascene process. For example, aluminum is deposited using a subtractive process while copper is deposited using an additive process. In a subtractive process, a blanket layer of metal is deposited, which is then structured using lithography and etch process. In contrast, in an additive process, an insulating layer is patterned to form openings, which are then filled with a metal.

As an illustration, in various embodiments of the invention, the metal and via levels may be formed using a single damascene process or a dual damascene process. In a single damascene process, a single layer of insulating material is patterned with a pattern for conductive features, such as conductive lines, conductive vias. In contrast, in a dual damascene process, the vias and metals lines are patterned for conductive features and filled in a single fill step with a conductive material.

Figure 10A:
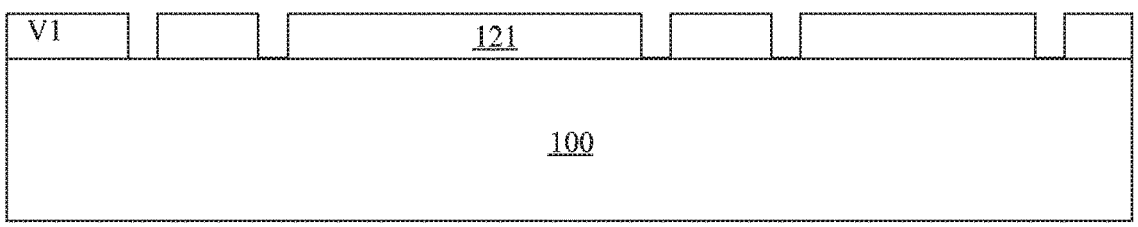
Figure 10B:
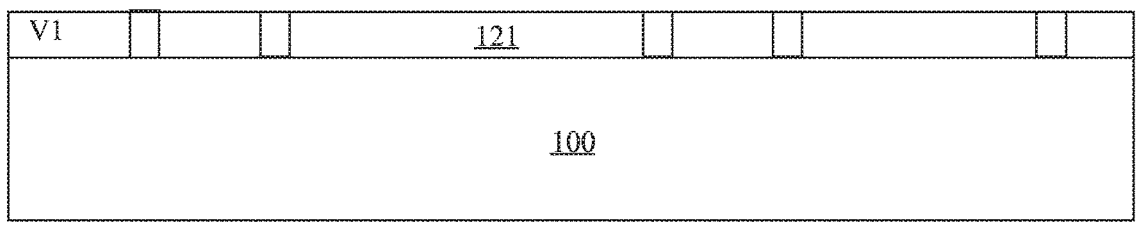
Figure 10C:
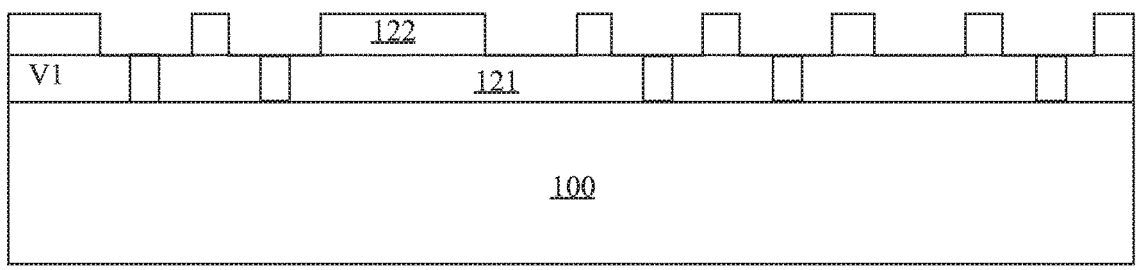

An example of this process using the single damascene process is illustrated in FIGS. 10A-10C for the formation of the vias in the first via level $V_1$. Referring to FIG. 10A, a first insulating layer 121 is deposited over an etch stop liner (not shown) such as silicon nitride. The first insulating layer 121 is patterned using lithography. FIG. 10A illustrates a patterned first insulating layer 121 and FIG. 10B illustrates this layer after via formation (via fill and planarization). The vias in the first via level $V_1$ may be formed by depositing an outer first conductive liner and then filling the remaining opening with a conductive material. The conductive liner may comprise, for example, CVD titanium nitride and silicon doped tungsten, although in other embodiments, the conductive liner may comprise other materials such as tantalum, tantalum nitride, titanium, tungsten nitride, ruthenium or any combinations thereof. The conductive material comprises tungsten, although in other embodiments, the conductive material may comprise other suitable materials such as copper, aluminum, tungsten, tantalum, titanium nitride, and ruthenium.

Figure 10D:
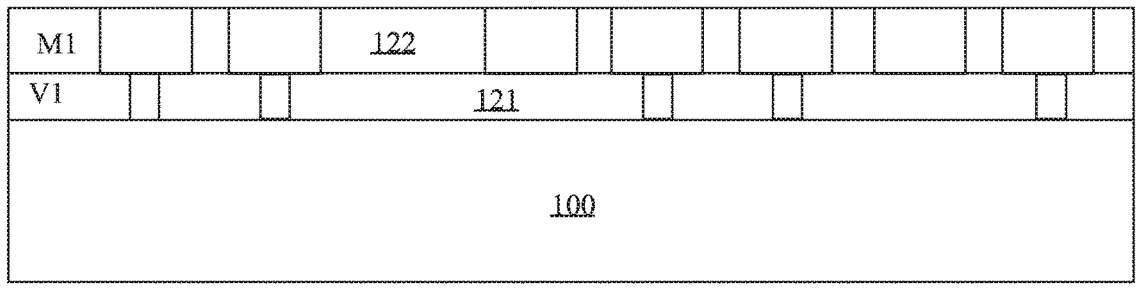
Figure 10E:
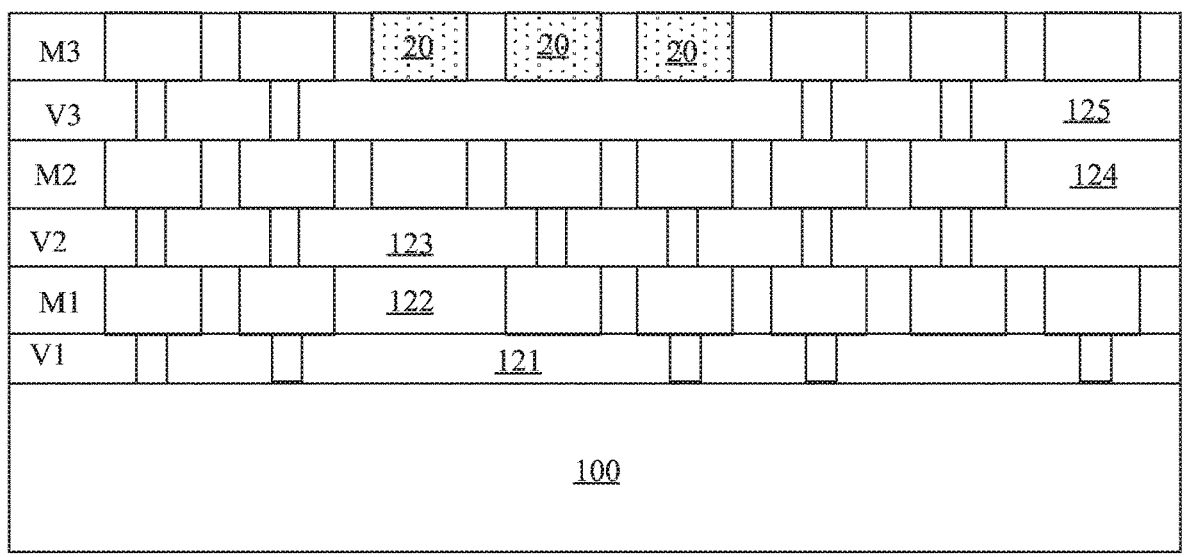

The first metal level $M_1$ is formed above the first via level $V_1$. A second insulating layer 122 is deposited over the first insulating layer 121. A etch stop liner may be formed between the first and the second insulating layer 121 and 122. FIG. 10C illustrates the formation of the metal one pattern and FIG. 10D illustrates the structure after filling of metal and subsequent planarization such as CMP, forming metal lines in the first metal level M1. An additional barrier layer (to prevent metal diffusion) and seed layer for electroplating may be deposited before the filling of metal. Examples of the barrier layer may be similar to the conductive liner of the vias. After forming the barrier layer, a seed layer may be deposited using a physical vapor deposition. Then, an electroplating process may be used to fill the opening to form a metal line. Subsequent metal and via levels are formed in a similar manner. Metal level $M_2$, $M_3$ and via levels $V_2$, $V_3$ are illustrated in FIG. 10E, which also shows the shield lines 20 in the third metal level $M_3$. A typical fabrication process may use single or dual damascene processes or combinations thereof in building a multitude of metal and via levels. In some embodiments, large parts of the metal level such as third metal level $M_3$ may be used for the shield lines.

Figure 10F:
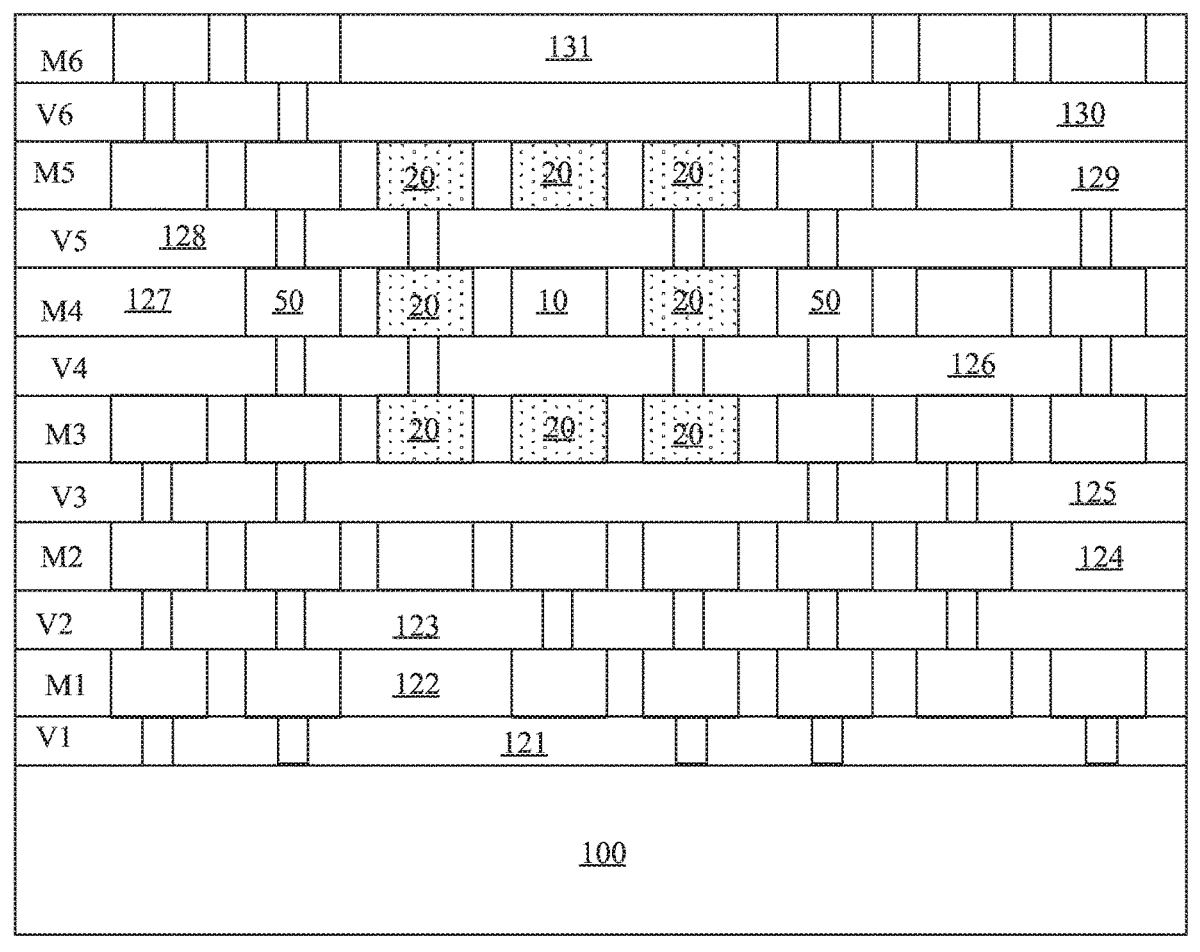

FIG. 10F illustrates the semiconductor device after forming additional shield lines 20 and the metal line configured to carry a high voltage, i.e., the first metal line 10. Additionally, in some embodiments, the testing process may be performed before final fabrication, for example, in this case after the formation of the fifth metal level $M_5$. Thus, in some embodiments, the subsequent metal level may be used to seal off the shield line 20. For example, the eleventh insulating layer 131 and the twelfth insulating layer 132 cover the shield lines 20 preventing the shield line 20 from being contacted after completion of the fabrication process.

Figure 11A:
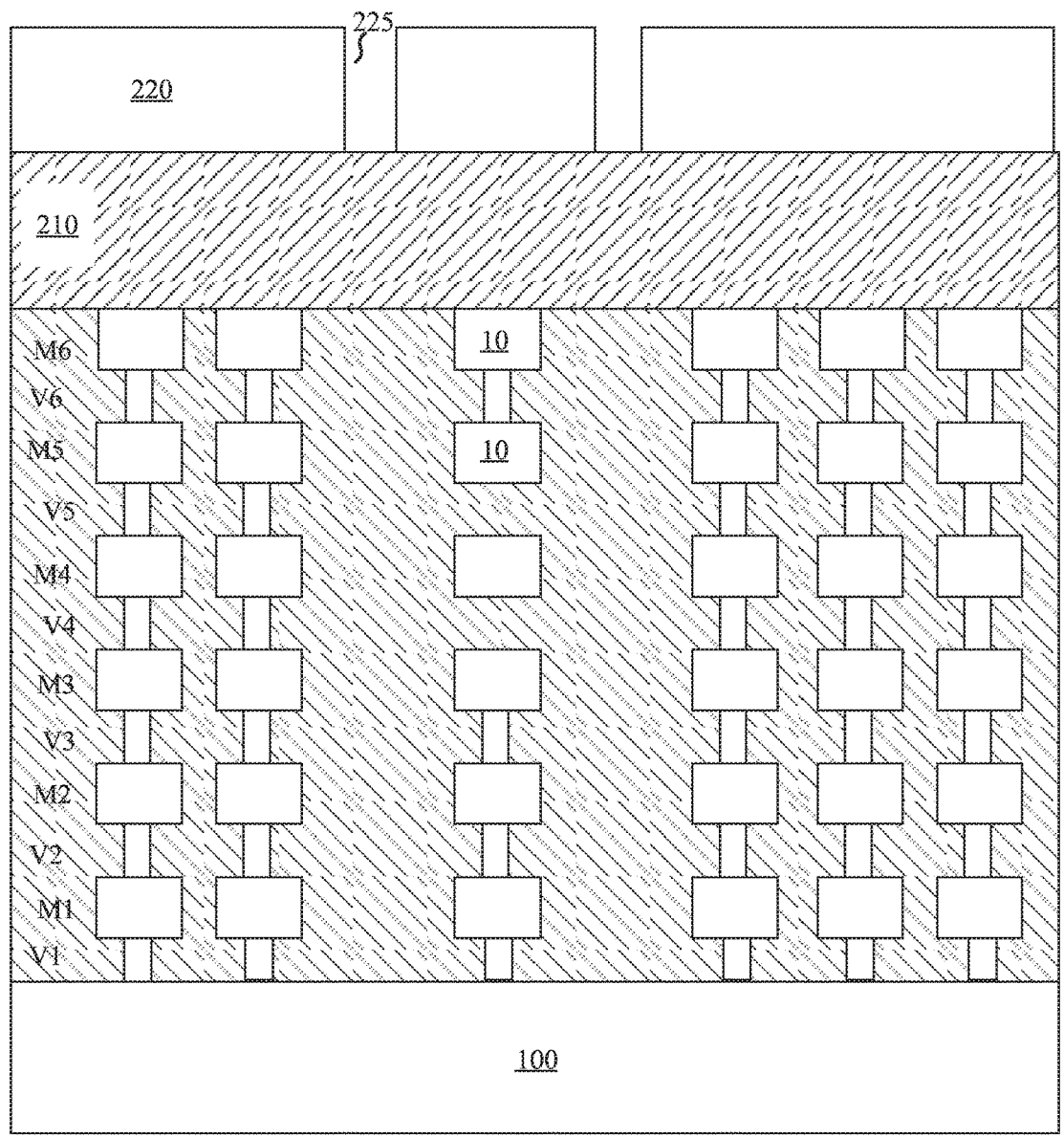
Figure 11B:
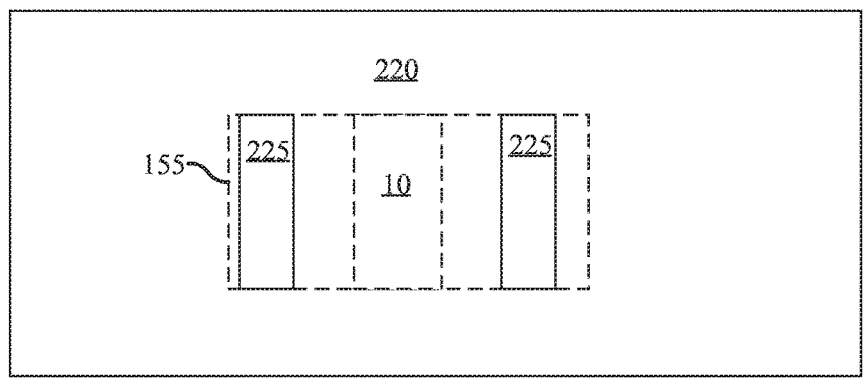

FIG. 11, which includes FIGS. 11a-11F, illustrates the semiconductor device during various stages of processing in accordance with an embodiment of the present invention, wherein FIGS. 11A, 11C-11F illustrate cross-sectional view and FIG. 11B illustrates a top view.

In the embodiment described in FIG. 10, the shield lines are formed as part of the conventional back end of the line processing. Accordingly, the regions used for shield lines cannot be used for interconnecting components of the semiconductor device. In this alternative embodiment, the shield lines are formed after the completion of all the metal lines using conventional back end of the line processing. Consequently, in this embodiment, a thin interlayer metal may be deposited between high voltage and low voltage lines in critical areas of the chip.

Figure 11C:
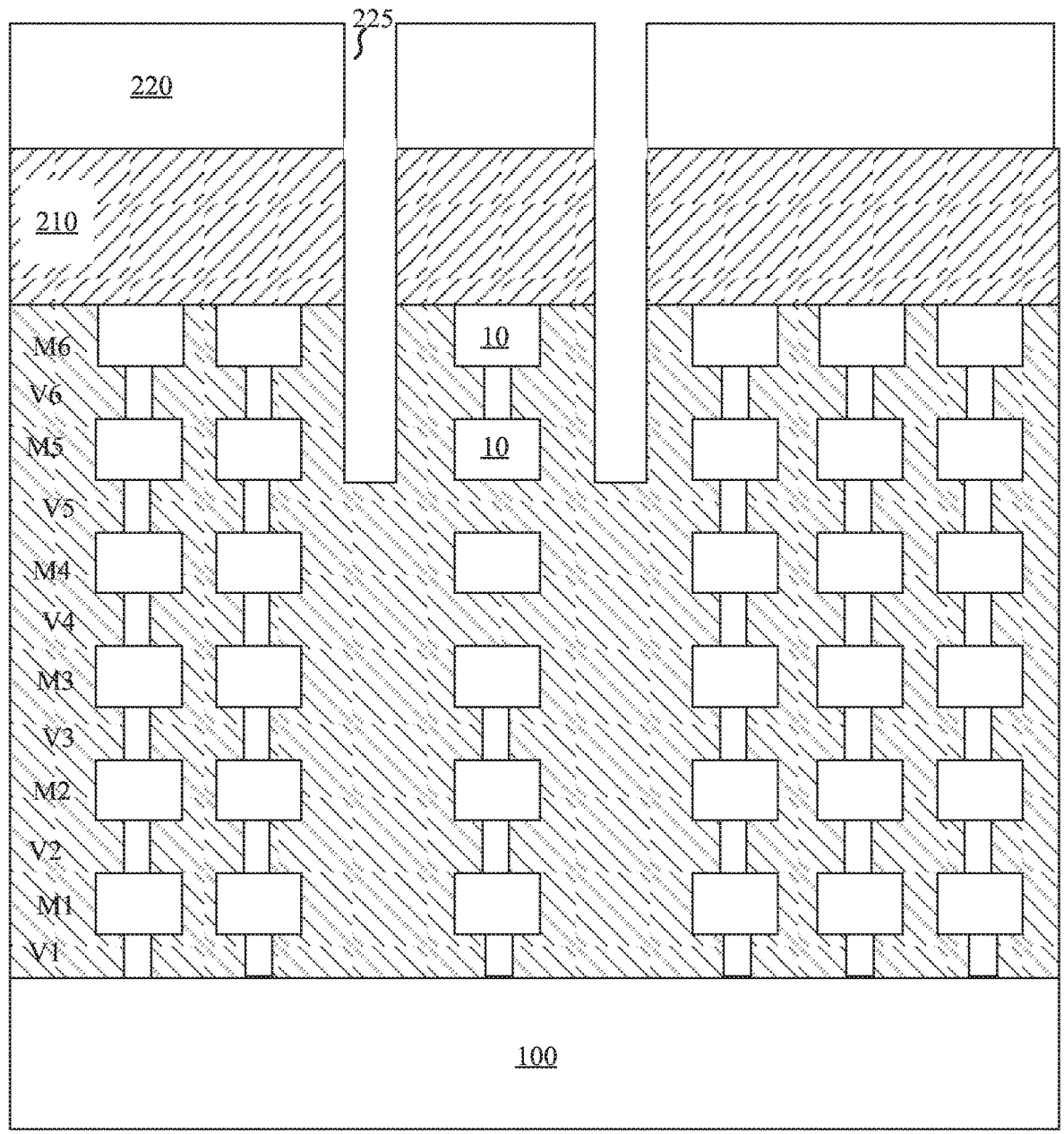

As illustrated in the top of FIG. 11B, the region 155 is identified as needing an additional testing process. Referring to FIGS. 11A and 11B, a hard mask layer 220 is deposited over the semiconductor device and patterned using lithography and etch processes to form openings 225. The patterned hard mask 220 exposes a passivation layer 210 disposed over the semiconductor device. Using the patterned hard mask 220, an anisotropic etching process is performed to etch underlying insulating layers (FIG. 11C).

Figure 11D:
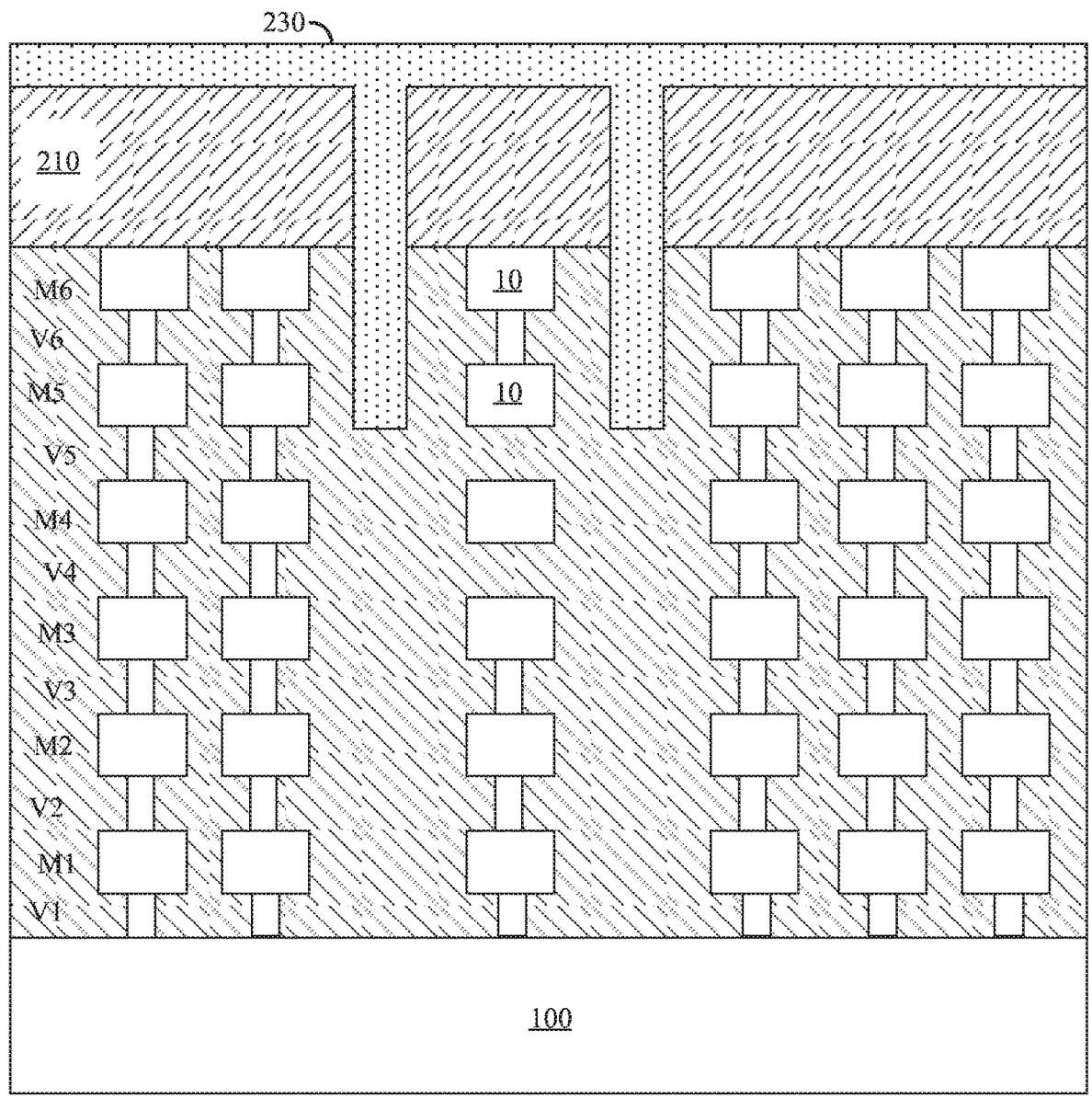
Figure 11E:
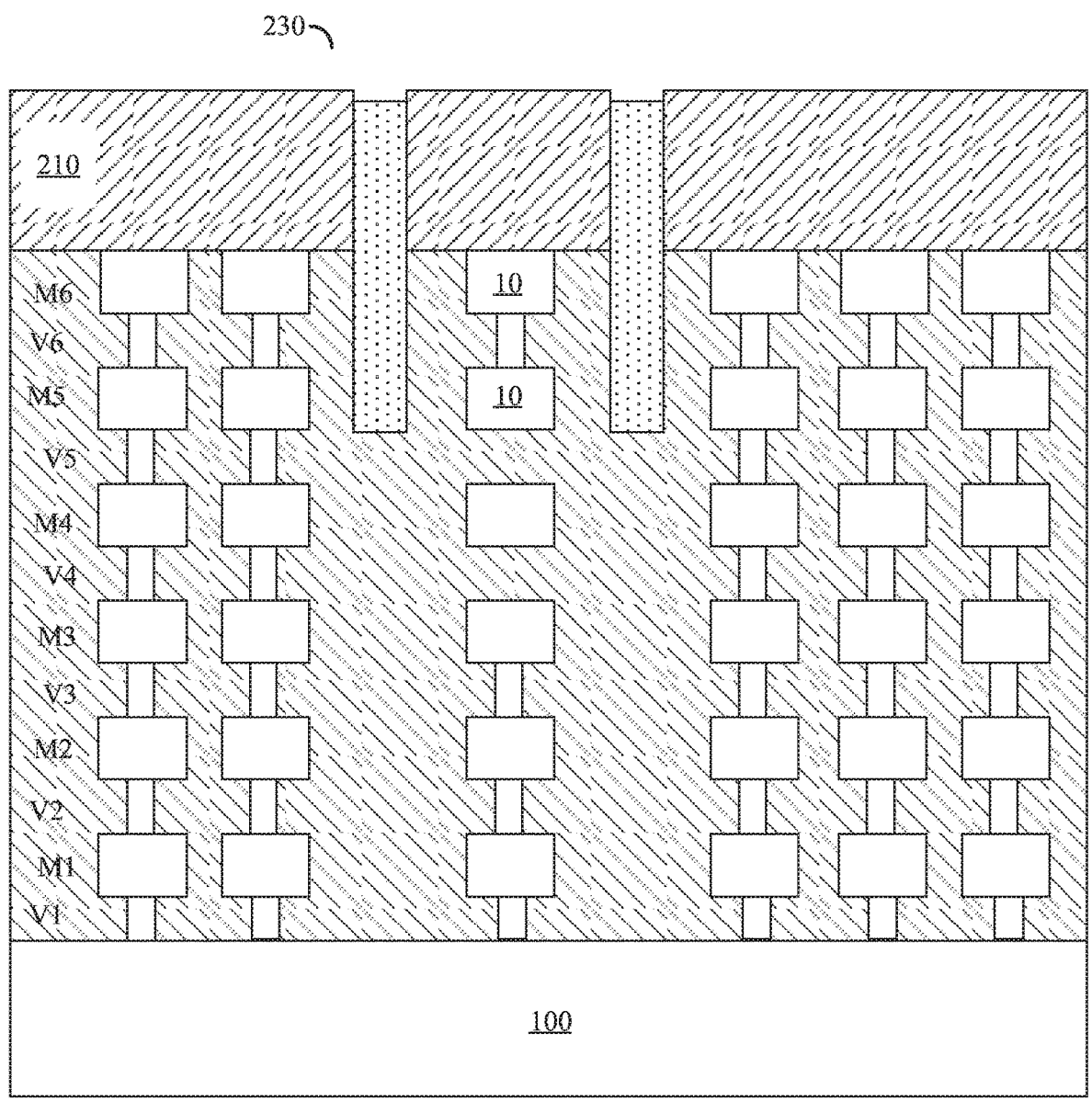
Figure 11F:
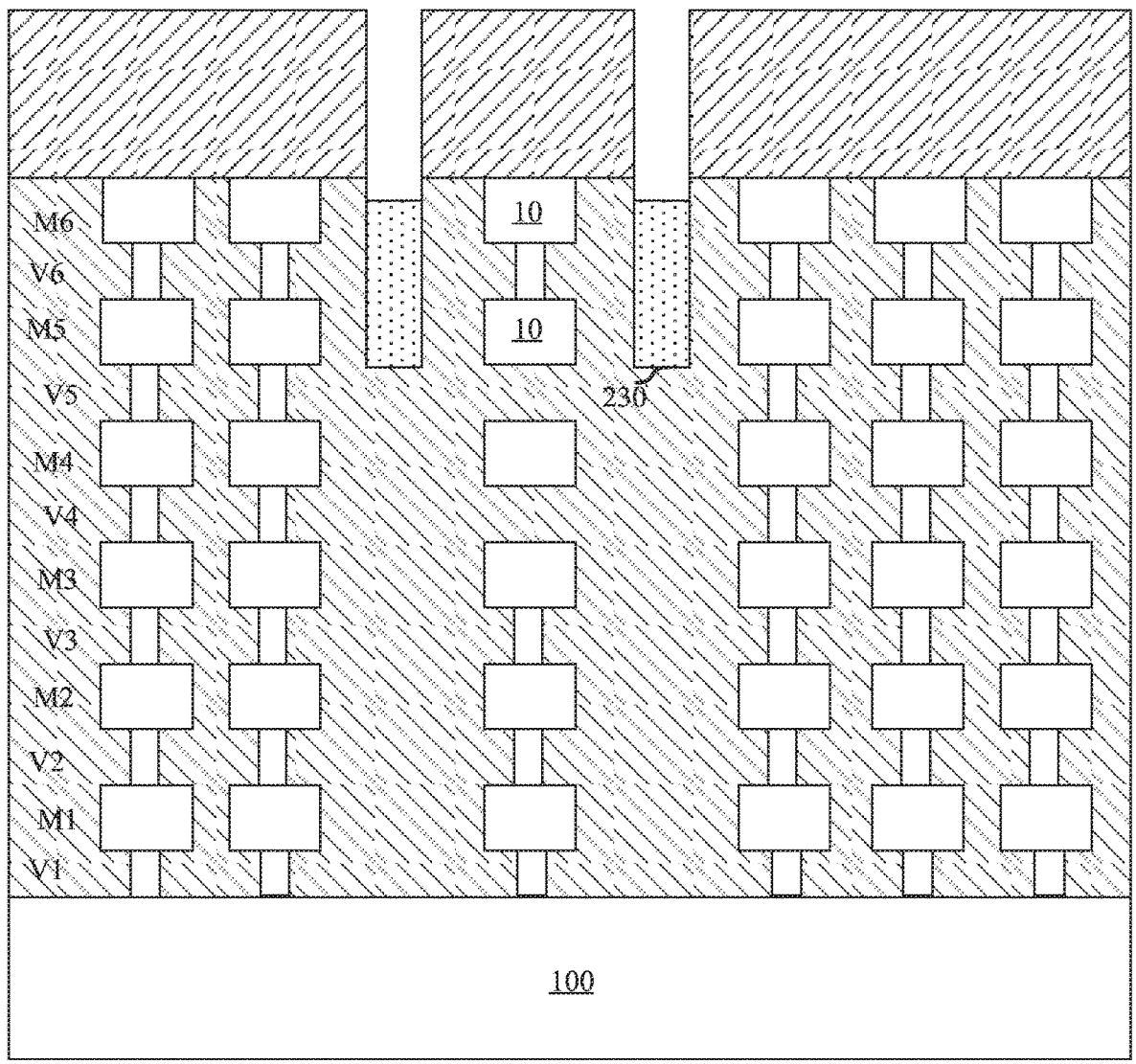

Referring to FIG. 11D, a fill metal 230 is deposited within the openings 225. The fill metal 230 may partially or completely fill the openings 225. For example, as illustrated in FIG. 11D, the fill metal 230 may be overfilled. Next, as illustrated in FIG. 11E, the fill metal 230 is etched to remove any fill metal 230 from the top surface of the passivation layer 210. FIG. 11F illustrates another embodiment showing a partially fill of the openings 225, for example, by using an increased etch back or by controlling the deposition time.

FIG. 12, which includes FIGS. 12A-12F, illustrates the semiconductor device during various stages of wafer level packaging in accordance with an embodiment of the present invention. FIG. 12 illustrates a magnified cross-sectional view of the semiconductor package during fabrication showing front side metallization in accordance with an embodiment of the invention.

Embodiments of the present invention may also be applied to front and back side redistribution lines. As an illustration, FIG. 12 discloses the application of embodiments of the present invention to Wafer Level Processing.

Figure 12A:
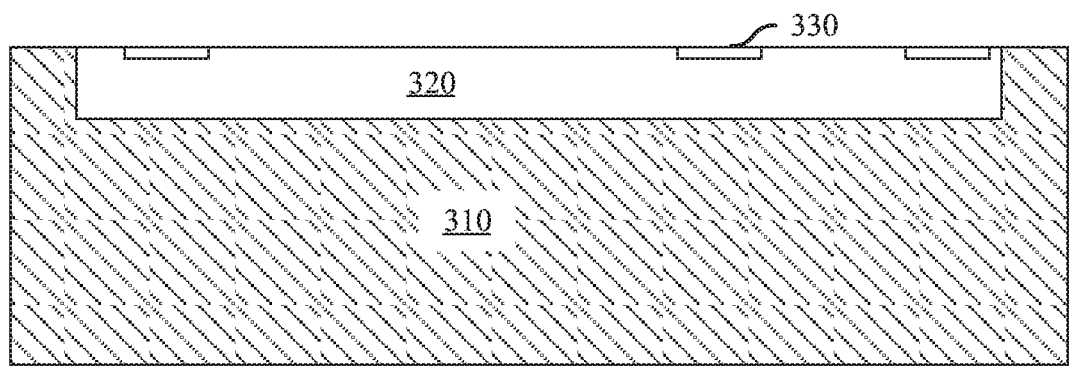
FIGS. 12A-12F illustrate the semiconductor device during various stages of wafer level packaging in accordance with an embodiment of the present invention.

FIG. 12A illustrates a reconstituted wafer 300 comprising a plurality of semiconductor chips 320 having a plurality of contact pads 330. The plurality of semiconductor chips 320 are embedded in an encapsulant 310, which at least partially encloses the plurality of semiconductor chips 320. The encapsulant 310 provides mechanical and thermal stability during subsequent processing.

Figure 12B:
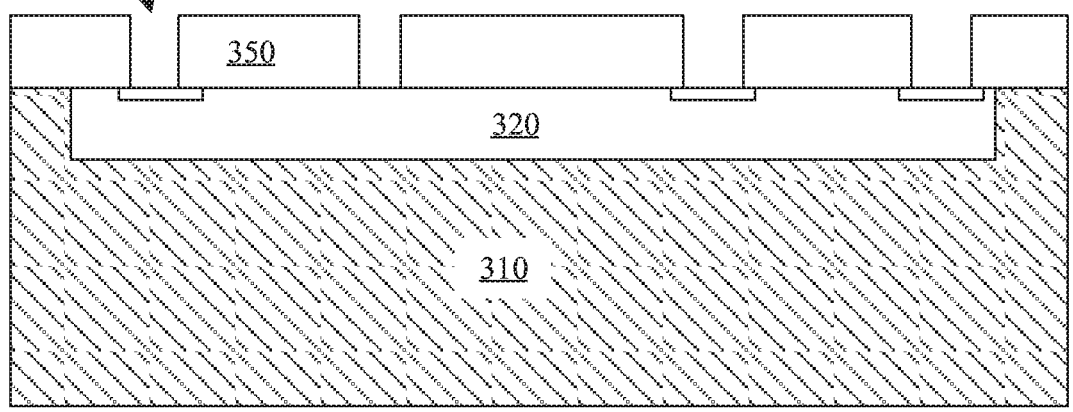

Referring to FIG. 12B, a passivation layer 350 may be formed around the front side metallization layer and patterned. In various embodiments, the passivation layer 350 is an insulating layer. In one or more embodiments, the passivation layer 350 may comprise an oxide layer or an oxide/nitride layer stack. In other embodiments, the passivation layer 350 may comprise silicon nitride, silicon oxynitride, FTEOS, SiCOH, polyimide, photoimide, BCB or other organic polymers, or combinations thereof. An optional insulating liner may be formed above the passivation layer 350. The optional insulating liner may comprise a nitride layer, in one embodiment. In various embodiments, the optional insulating liner may comprise FTEOS, $SiO_2$, SiCOH, or other low-k materials.

Using a photolithography process, the passivation layer 350 is patterned to open the plurality of contact pads 330 on the last metal level of the plurality of semiconductor chips 320. However, the openings 340 are also formed in regions identified as being critical (adjacent high voltage and low voltage lines).

Figure 12C:
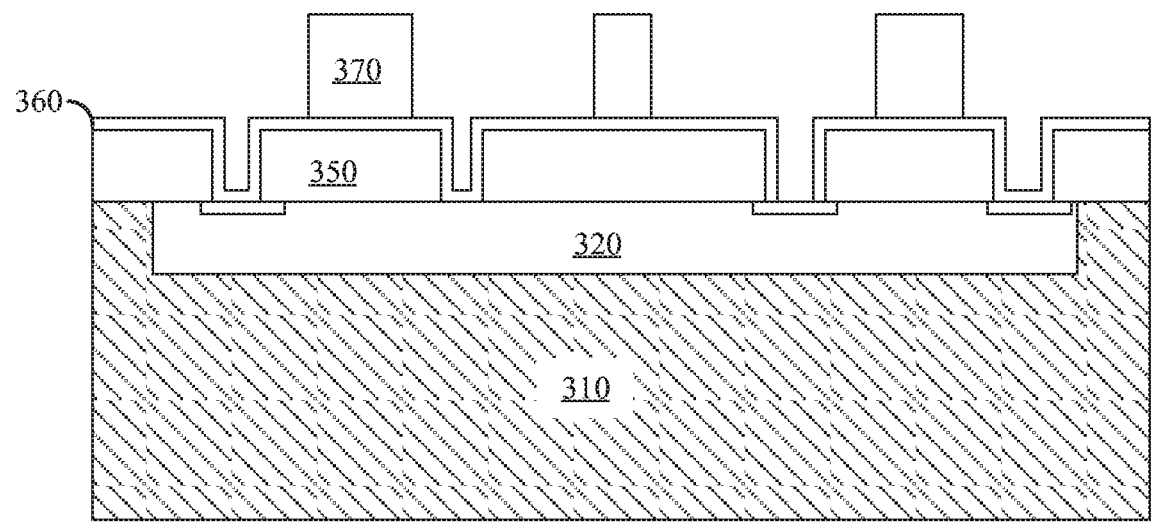

FIG. 12C illustrates a magnified view of the semiconductor package during fabrication after formation of front side redistribution layer in accordance with an embodiment of the invention.

Referring to FIG. 12C, a conductive liner 360 is deposited. The conductive liner 360 may include an adhesion layer, a barrier layer, and/or a seed layer. In various embodiments, the conductive liner 360 is deposited using a deposition process to form a conformal layer comprising Ti, Ta, Ru, W, combinations thereof, or a nitride, silicide, carbide thereof. Examples of such combinations include TiN, TaN, and WN, and TiW. In various embodiments, the conductive liner 360 is deposited using a chemical vapor deposition, plasma vapor deposition or atomic layer deposition. In various embodiments, the conductive liner 360 comprises a thickness of about 20 nm to about 200 nm. The conductive liner 360 is a diffusion barrier metal and prevents out-diffusion of copper from the last metal line of the front side metallization layer as well as prevents intermixing with further metallic layers.

The conductive liner 360 may include a conductive seed layer deposited over the barrier layer. The conductive seed layer covers the conductive barrier layer. In various embodiments, the conductive seed layer is deposited using a deposition process to form a conformal layer. In various embodiments, the conductive seed layer is deposited using a chemical vapor deposition, plasma vapor deposition or atomic layer deposition. In various embodiments, the conductive seed layer comprises a thickness of about 20 nm to about 200 nm. The conductive seed layer provides the seed layer for the growth during the subsequent electroplating process. In various embodiments, the conductive seed layer may comprise copper or other metals like Al, W, Ag, Au, Ni, or Pd.

As also illustrated in FIG. 12C, a thick photo resist layer 370 is deposited over the conductive liner 360. In various embodiments, the photo resist layer 370 is several microns thick, and varies from about 1 μm to about 10 μm, in one embodiment. After deposition, the photo resist layer 370 fills the openings previously formed in the passivation layer 350. The photo resist layer 370 is exposed and developed. The patterned photo resist layer 370 comprises patterns for redistribution metal lines and contact pads.

Figure 12D:
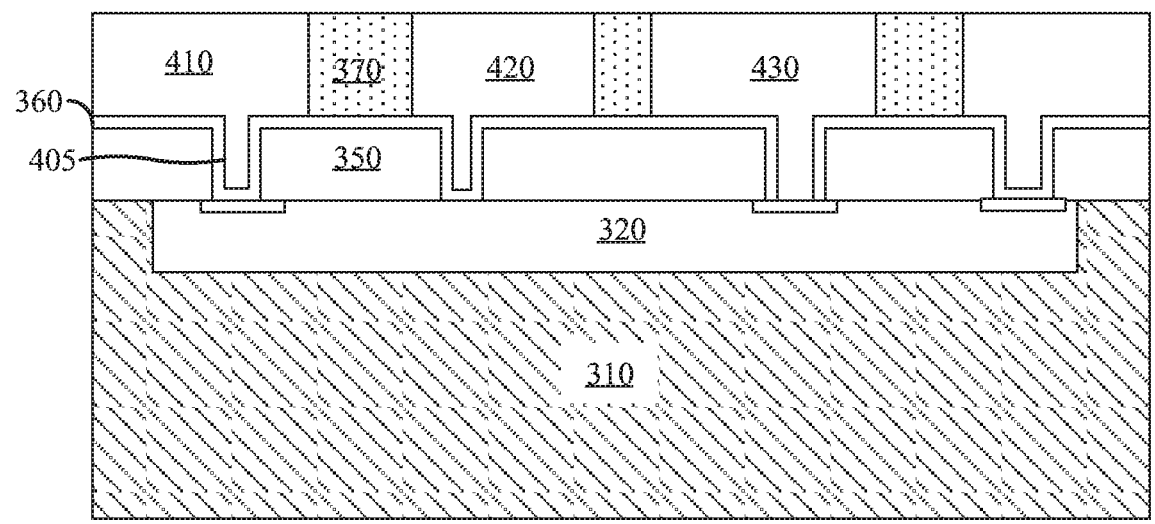

Referring next to FIG. 12D, a first redistribution metal line 410, a second redistribution metal line 430, a shield redistribution line 420, and contact pads 405 are formed by electroplating a fill metal over the conductive liner 360 exposed between the patterned photo resist layer 370. In various embodiments, the fill metal comprises copper, although in some embodiments, other suitable conductors are used. The conductive liner 360 may comprise the same material as the material of the subsequent metal lines to enable electroplating, in one embodiment. In various embodiments, the first redistribution metal line 410, the second redistribution metal line 430, a shield redistribution line 420, and contact pads 405 may comprise multiple layers, for example, Cu/Ni, Cu/Ni/Pd/Au, Cu/NiMoP/Pd/Au, or Cu/Sn, in one embodiment.

Figure 12E:
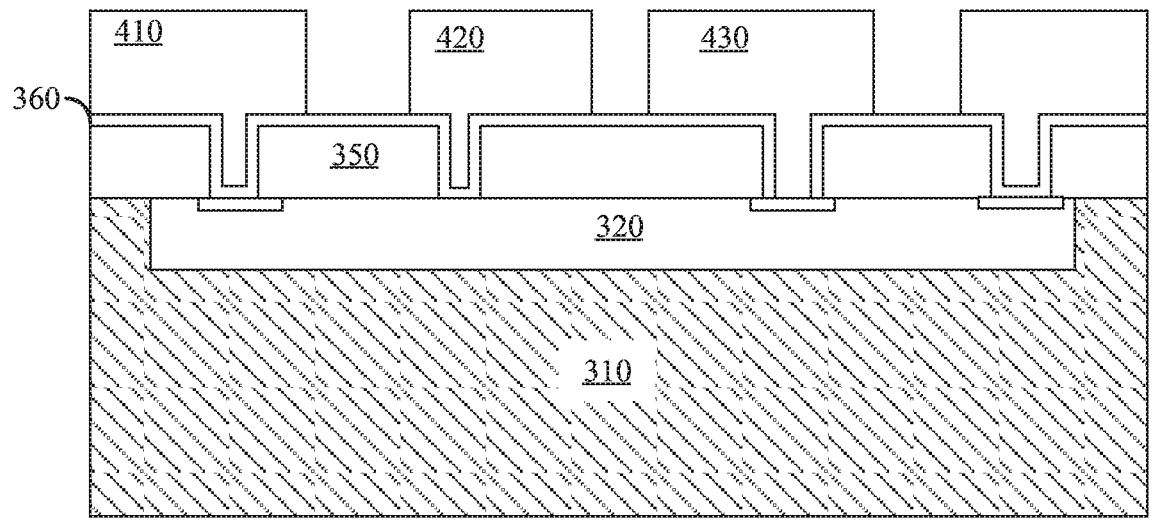
Figure 12F:
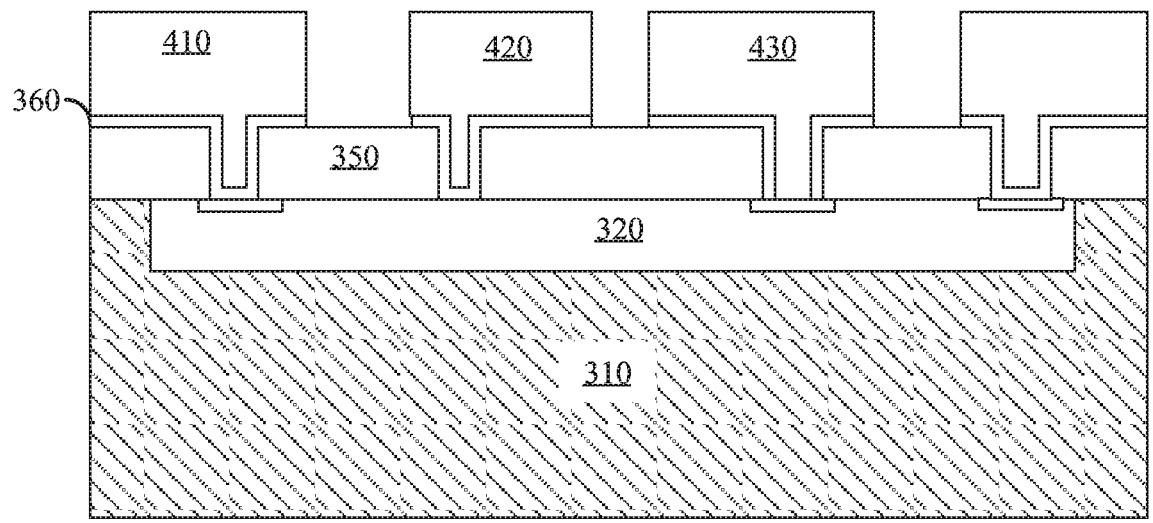

Referring next to FIG. 12E, the patterned photo resist layer 370 is stripped to expose the conductive liner 360. The exposed conductive liner 360 is etched away, for example, using a wet etch chemistry. The structure at this stage is illustrated in FIG. 12F. Thus, the shield redistribution line 420 may be used in the same manner as the shield lines described in various embodiments.

Figure 13A:
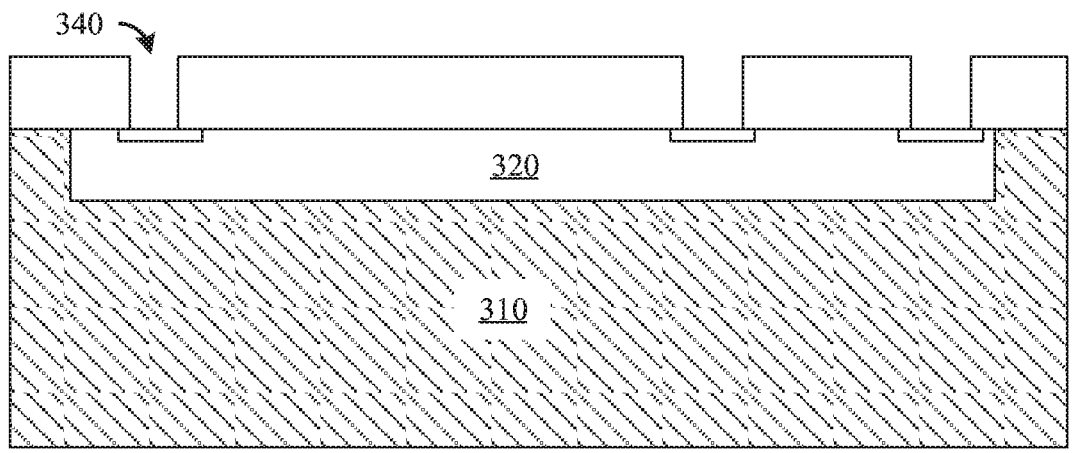
Figure 13B:
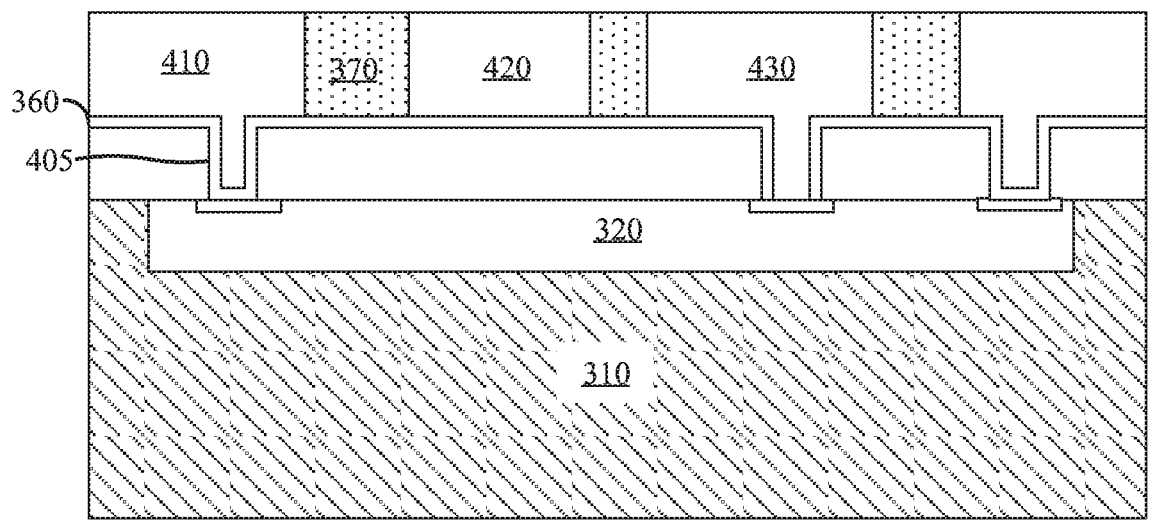
Figure 13C:
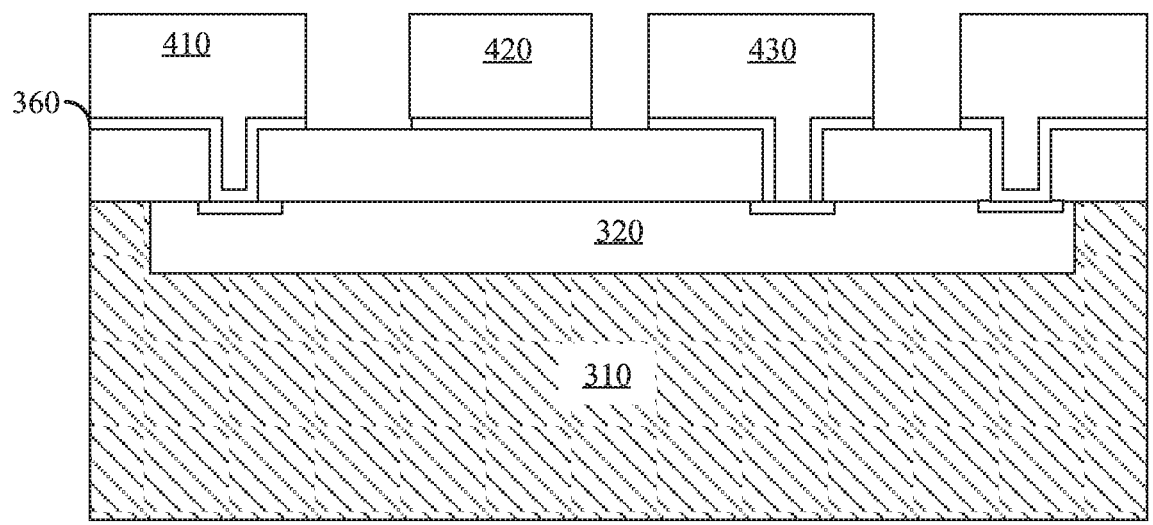

FIG. 13, which includes FIGS. 13A-13C, illustrates a further embodiment of a process including wafer level processing to form a shield line between adjacent redistribution lines.

In this embodiment, compared to the previous embodiment, the shield lines do not extend parallel to the contact vias. Rather, the shield lines are formed only as redistribution lines above the passivation layer 350. Accordingly, FIG. 13A illustrates the device after the formation of openings 340. FIG. 13B illustrates the device after the formation of the patterned photo resist layer 370 and the shield redistribution line 420, the first redistribution metal line 410, the second redistribution metal line 430. FIG. 13C illustrates the device after removing, i.e., etching the patterned photo resist layer 370.

As described in various embodiments, a material that comprises a metal may, for example, be a pure metal, a metal alloy, a metal compound, an intermetallic and others, i.e., any material that includes metal atoms. For example, copper may be a pure copper or any material including copper such as, but not limited to, a copper alloy, a copper compound, a copper intermetallic, an insulator comprising copper, and a semiconductor comprising copper.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. As an illustration, the embodiments described in FIGS. 1-12 may be combined with each other in alternative embodiments. It is therefore intended that the appended claims encompass any such modifications or embodiments.

Although the present invention and its advantages have been described in detail, it should be understood that various changes, substitutions and alterations can be made herein without departing from the spirit and scope of the invention as defined by the appended claims. For example, it will be readily understood by those skilled in the art that many of the features, functions, processes, and materials described herein may be varied while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of fabricating a semiconductor device, the method comprising:
 forming a reconstituted wafer comprising a plurality of semiconductor chips having a plurality of contact pads;
 forming a passivation layer over the reconstituted wafer;
 forming a plurality of openings in the passivation layer to expose the plurality of contact pads; and
 forming a first redistribution metal line, a second redistribution metal line, a shield redistribution line, and contact pads by electroplating a fill metal, wherein the first redistribution metal line and the second redistribution metal line are metal lines configured to supply different voltages to the plurality of semiconductor chips, and wherein the shield redistribution metal line is not coupled to any functional circuit in any of the plurality of semiconductor chips in the reconstituted wafer, and wherein the shield redistribution metal line is configured to be isolated from all internal nodes of the plurality of semiconductor chips in the reconstituted wafer.

2. The method of claim 1, wherein the shield redistribution metal lines do not extend into opening in the passivation layer.

3. The method of claim 1, wherein the shield redistribution metal line is not coupled to any functional circuit in any of the plurality of semiconductor chips in the reconstituted wafer.

4. The method of claim 1, further comprising forming exposed pads, wherein a stress voltage is configured to be applied to the shield redistribution metal lines through the exposed pads.

5. The method of claim 1, wherein forming a first redistribution metal line, a second redistribution metal line, a shield redistribution line, and contact pads further comprises:
forming the first redistribution metal line, the second redistribution metal line, and the shield redistribution line in the same metal level.

6. The method of claim 1, wherein forming a first redistribution metal line, a second redistribution metal line, a shield redistribution line, and contact pads further comprises:
forming the first redistribution metal line, the second redistribution metal line, and the shield redistribution line in different metal levels.

7. The method of claim 1, further comprising a third redistribution line disposed over the shield redistribution line, wherein a stress voltage is configured to be applied to the shield redistribution metal lines through the third redistribution line.

8. The method of claim 1, wherein forming a first redistribution metal line, a second redistribution metal line, a shield redistribution line, and contact pads further comprises:
forming a seed layer over the plurality of openings and the passivation layer;
forming a patterned photo resist layer over the seed layer;
electroplating the fill metal between the patterned photo resist layer;
removing the patterned photo resist layer to expose the underlying portion of the seed layer; and
removing the exposed seed layer.

9. The method of claim 1, wherein the fill metal comprises copper.

10. A method of fabricating a semiconductor device, the method comprising:
providing a substrate comprising a semiconductor chip having circuitry embedded in an encapsulant;
forming a first redistribution metal line over the semiconductor chip;
forming a second redistribution metal line adjacent the first redistribution metal line, wherein the first redistribution metal line and the second redistribution metal line are metal lines configured to supply different voltages to the circuitry; and
forming a third redistribution metal line between the first redistribution metal line and the second redistribution metal line, the third redistribution metal line not being part of any functional circuit in the substrate and not coupled to any potential node in the substrate, wherein the third redistribution metal line is configured to be isolated from all internal potentials; and
forming an exposed pad, wherein the third redistribution metal line is coupled to the exposed pad.

11. The method of claim 10, wherein the third redistribution metal line comprises a different material than the first redistribution metal line.

12. The method of claim 10, wherein the first redistribution metal line comprises copper.

13. The method of claim 12, wherein the third redistribution metal line comprises a metal nitride.

14. The method of claim 10, wherein the first redistribution metal line is configured to supply a high voltage to the circuitry in the substrate during operation, wherein the second redistribution metal line is configured to supply a low voltage to the circuitry in the substrate during operation.

15. The method of claim 10, wherein the first redistribution metal line, the second redistribution metal line, and the third redistribution metal line are formed in the same metal level.

16. The method of claim 10, wherein the first redistribution metal line, the second redistribution metal line, and the third redistribution metal line are each formed in a different metal level.

17. The method of claim 10, further comprising forming a fourth redistribution metal line adjacent the first redistribution metal line, wherein the fourth redistribution metal line is in a different metal level than the third redistribution metal line, and wherein the fourth redistribution metal line is coupled to the third redistribution metal line.

18. The method of claim 10, further comprising forming a first via under the first redistribution metal line, forming a second via under the second redistribution metal line, and forming a third via disposed under the third redistribution metal line.

19. A method comprising:
identifying a region in a layout of a semiconductor device, the region comprising a first metal line configured to be coupled to a high voltage node and a second metal line configured to be coupled to a low voltage node; and
modifying the layout of the semiconductor to include a third metal line between the first metal line and the second metal line, the third metal line having an external contact pad but not being part of, and not coupled to, any functional circuit of the semiconductor device;
providing a substrate comprising a semiconductor chip having circuitry embedded in an encapsulant;
forming a first redistribution metal line over the semiconductor chip;
forming a second redistribution metal line adjacent the first redistribution metal line, wherein the first redistribution metal line and the second redistribution metal line are metal lines configured to supply different voltages to the circuitry;
forming a third redistribution metal line between the first redistribution metal line and the second redistribution metal line, the third redistribution metal line not being part of any functional circuit in the substrate and not coupled to any potential node in the substrate, wherein the third redistribution metal line is configured to be isolated from all internal potentials; and
forming an exposed pad, wherein the third redistribution metal line is coupled to the exposed pad.

20. The method of claim 19, wherein the ratio of the potential applied during operation to the high voltage node and the potential applied during operation to the low voltage node is 5:1 to 100:1.

21. The method of claim 19, wherein the distance between the first metal line and the second metal line is a minimum inter-metal distance for the process technology, wherein the distance between the first metal line and the third metal line is less than the minimum inter-metal distance.

22. The method of claim 19, wherein the first metal line, the second metal line, and the third metal line are in different mask layers.

23. The method of claim 19, wherein the first metal line, the second metal line, and the third metal line are in the same mask layers.

\* \* \* \* \*